(12) United States Patent
Bendlin et al.

(10) Patent No.: US 11,483,190 B2
(45) Date of Patent: Oct. 25, 2022

(54) LOW-RESOLUTION, LOW-POWER, RADIO FREQUENCY RECEIVER

(71) Applicants: AT&T Intellectual Property I, L.P., Atlanta, GA (US); University of Notre Dame du Lac, South Bend, IN (US)

(72) Inventors: Ralf Bendlin, Cedar Park, TX (US); Aditya Chopra, Austin, TX (US); Bertrand Martyn Hochwald, South Bend, IN (US); Nicholas Joseph Estes, South Bend, IN (US); Jonathan David Chisum, South Bend, IN (US); Kang Gao, San Diego, CA (US)

(73) Assignees: AT&T Intellectual Property I, L.P., Atlanta, GA (US); University of Notre Dame du Lac, South Bend, IN (US)

( * ) Notice: Subject to any disclaimer, the term of this patent is extended or adjusted under 35 U.S.C. 154(b) by 0 days.

(21) Appl. No.: 17/390,414

(22) Filed: Jul. 30, 2021

(65) Prior Publication Data
US 2022/0166655 A1 May 26, 2022

Related U.S. Application Data

(63) Continuation of application No. 17/103,152, filed on Nov. 24, 2020, now Pat. No. 11,121,896.

(51) Int. Cl.
*H04L 27/22* (2006.01)
*H04B 7/0413* (2017.01)

(52) U.S. Cl.
CPC ........... *H04L 27/22* (2013.01); *H04B 7/0413* (2013.01)

(58) Field of Classification Search
CPC ...... H04L 27/22; H04L 27/389; H04B 7/0413
See application file for complete search history.

(56) References Cited

U.S. PATENT DOCUMENTS

| 10,194,327 | B1 | 1/2019 | Khan |
| 10,333,604 | B2 | 6/2019 | Forenza et al. |
| 2007/0115160 | A1 | 5/2007 | Kleveland et al. |
| 2010/0239258 | A1 | 9/2010 | Calabretta et al. |

(Continued)

OTHER PUBLICATIONS

Jorgesen, Doug, "What happens when you underdrive a mixer?", https://www.markimicrowave.com/blog/what-happens-when-you-underdrive-a-mixer/, Apr. 30, 2015, 5pgs.

(Continued)

*Primary Examiner* — Rahel Guarino
(74) *Attorney, Agent, or Firm* — Guntin & Gust, PLC; Atanu Das

(57) ABSTRACT

Aspects of the subject disclosure may include, a non-linear energy detector that obtains baseband information from a mixed signal that corresponds to an information component of a received radio frequency (RF) signal, wherein the mixed signal comprises a local oscillator signal combined, without multiplication, with the received RF signal, wherein the received RF signal comprises a carrier wave component operating at a carrier frequency within a millimeter wave spectrum, wherein the non-linear energy detector is associated with a non-linear current-voltage (I-V) characteristic curve, and wherein the baseband information is obtained by applying the mixed signal to the non-linear I-V characteristic curve. Other embodiments are disclosed.

20 Claims, 13 Drawing Sheets

(56) References Cited

U.S. PATENT DOCUMENTS

2015/0030102 A1     1/2015   Hormis et al.
2017/0237454 A1*   8/2017   Weissman ................. H03F 3/24
                                                                                                      375/297

OTHER PUBLICATIONS

Long, S., "ECE145B/ECE218B Mixer Lectures", https://www.coursehero.com/file/37659401/Mixer1pdf/, Apr. 9, 2009, 65pgs.
Marki, Christopher, "The Mixer 10 Commandments—Marki Microwave RF & Microwave", https://www.markimicrowave.com/blog/the-mixer-10-commandments/, Apr. 29, 2010, 2 pgs.
Stiles, Jim, "Mixer Conversion Loss", https://wenku.baidu.com/view/c733d9150b4e767f5acfce87.html, The University of Kansas, Mar. 7, 2005, 6 pgs.

* cited by examiner

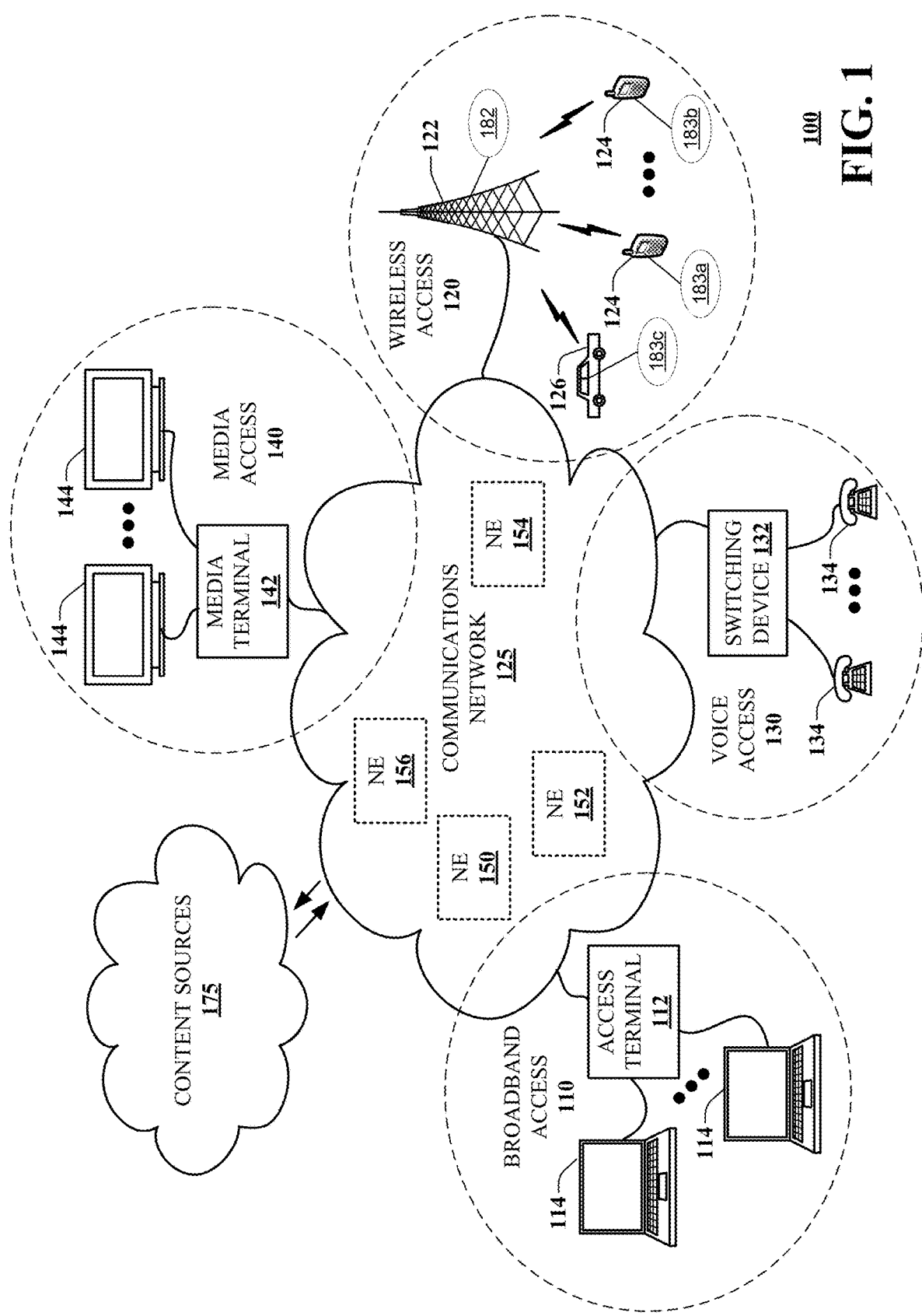

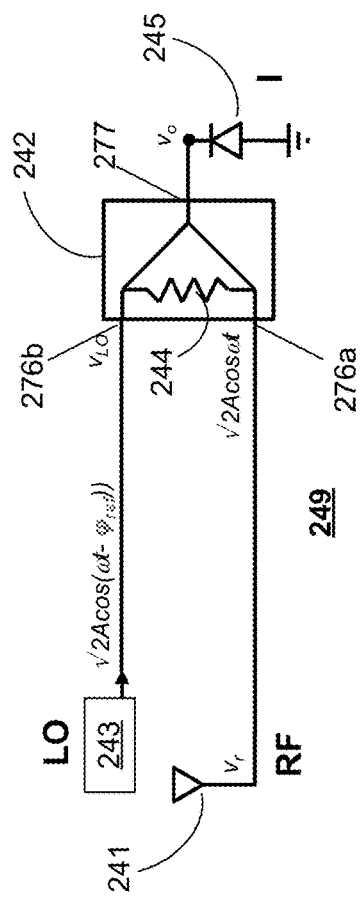
FIG. 2E
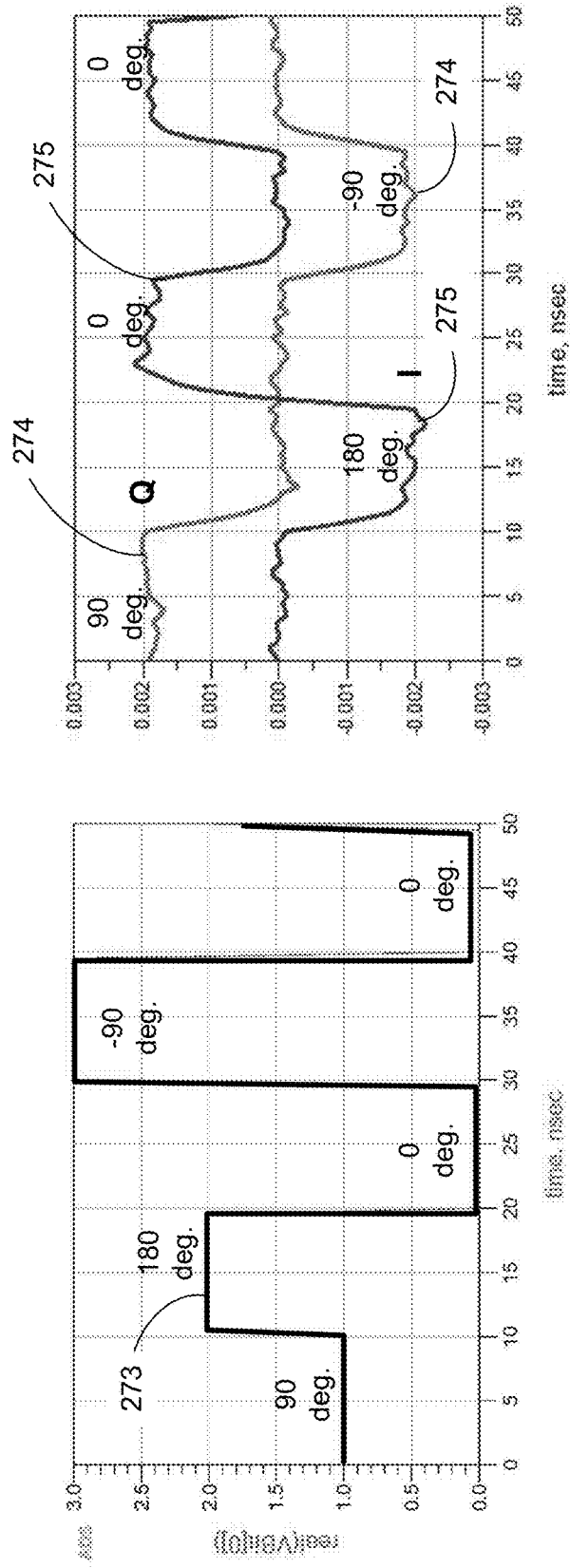
FIG. 2H
FIG. 2G

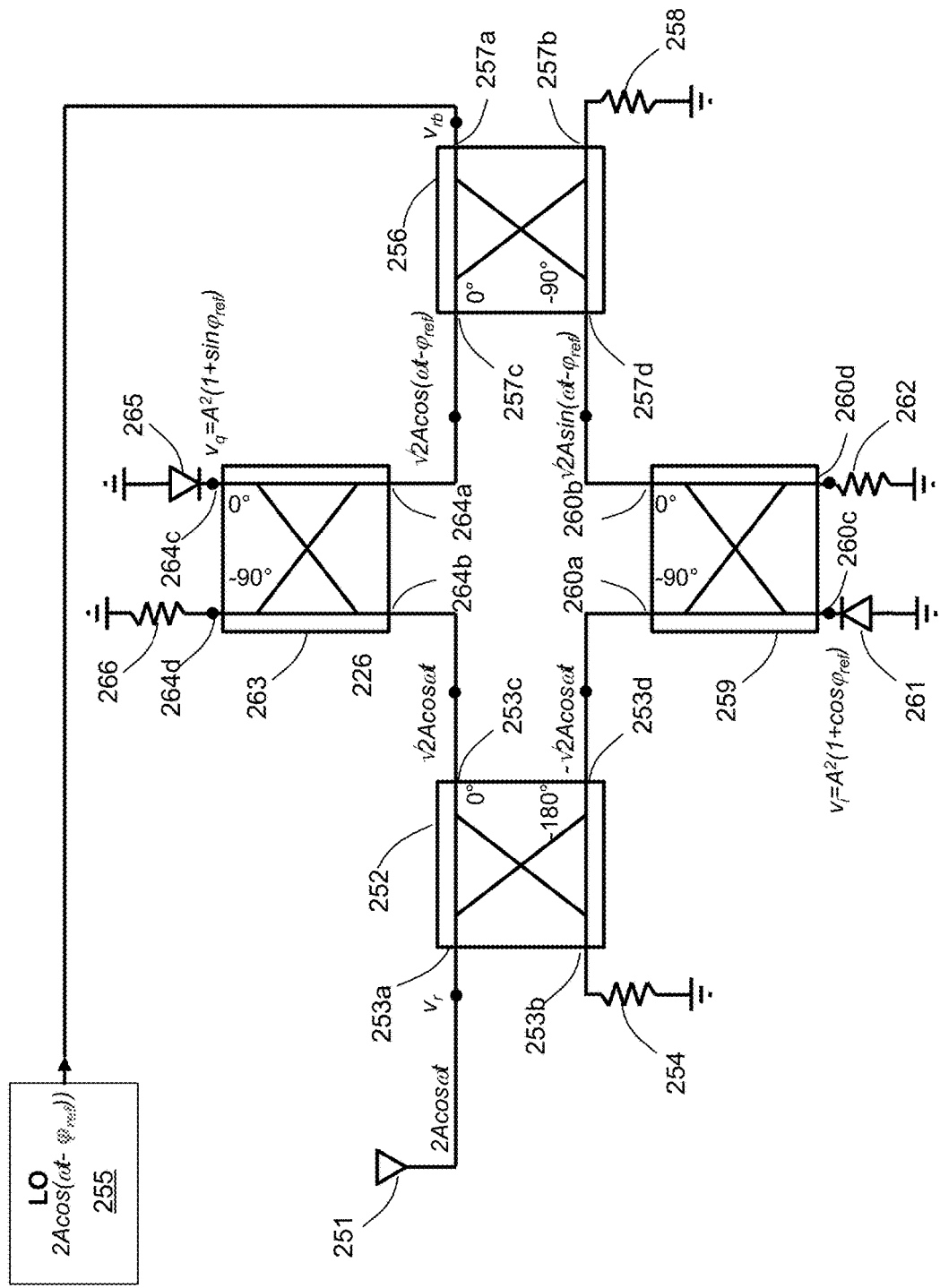

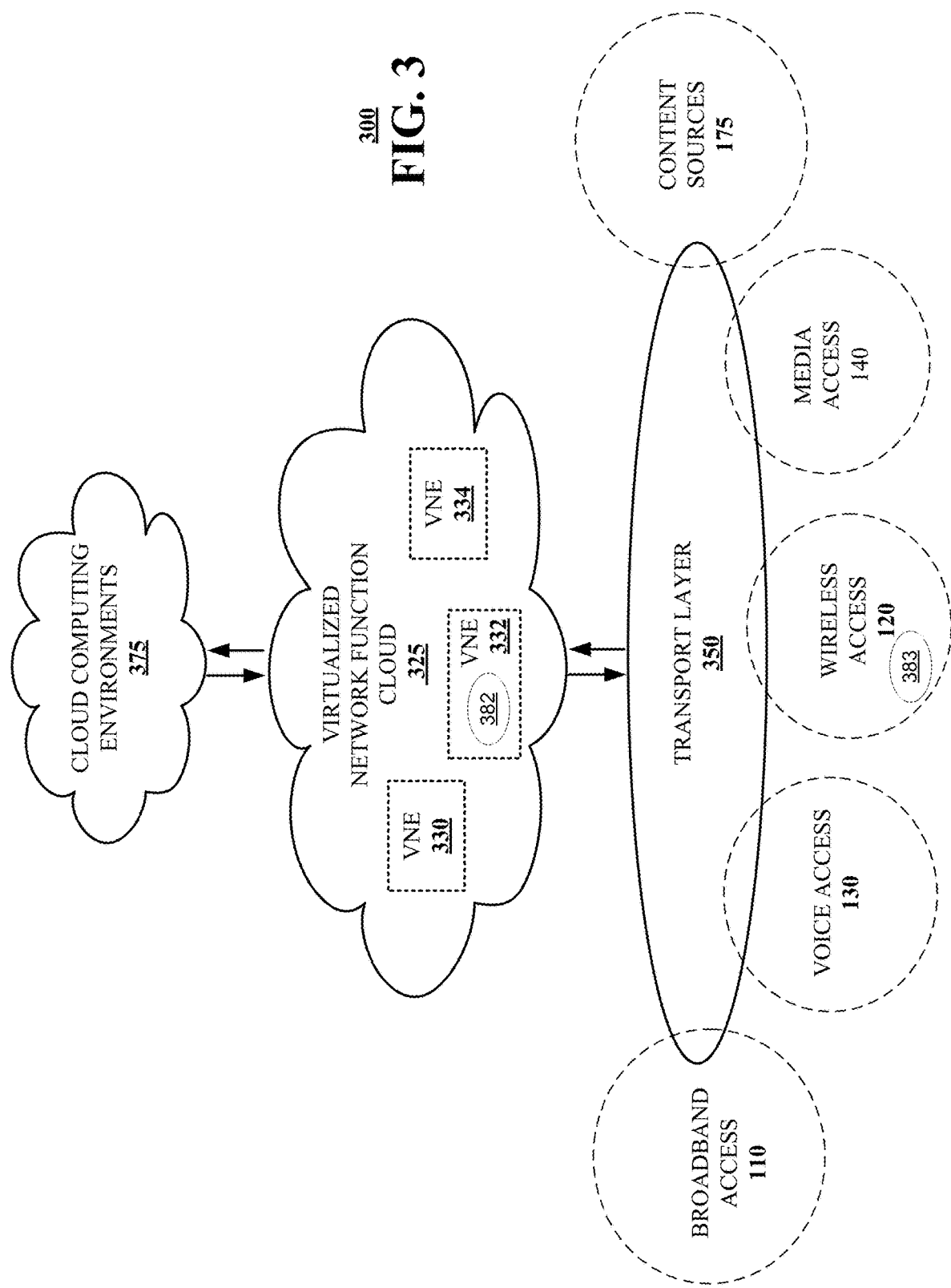

600

LOW-RESOLUTION, LOW-POWER, RADIO FREQUENCY RECEIVER

CROSS-REFERENCE TO RELATED APPLICATION

This application claims priority to and is a continuation of U.S. patent application Ser. No. 17/103,152, filed Nov. 24, 2020. All sections of the aforementioned application are incorporated herein by reference in their entirety.

GOVERNMENT LICENSE RIGHTS

This invention was made with government support under ECCS1731056 awarded by the National Science Foundation. The government has certain rights in the invention.

FIELD OF THE DISCLOSURE

The subject disclosure relates to low-resolution, low-power, radio frequency receiver.

BACKGROUND

The development of new wireless communications technologies has traditionally been driven by a desire for higher data rates. For example, in commercial cellular applications, rapid increases in a number of end-users and complexity of mobile applications of recent decades have demanded a wireless communications solution that provides low latency while achieving high instantaneous data rates in a complicated physical environment with an unknown (a priori) number of users with unknown locations.

One solution to increase data rates includes moving to higher carrier frequencies, e.g., including millimeter wave frequencies operating at K-band and above, in which traditional narrowband designs lead to high absolute operating bandwidths. However, any move to such extreme frequencies does not come without cost. One such approach, termed 5G New Radio (NR) marks a paradigm shift from omnidirectional to directive communications as higher-gain antennas are required to maintain a constant-power link as the carrier frequency increases. Such requirements of high gain are a consequence of the Friis equation, which states that, for given antenna gain on transmit and receive, the receive power is inversely proportional to the square of the operating frequency. The current solution to this spatially-multiplexed paradigm is a phased array.

BRIEF DESCRIPTION OF THE DRAWINGS

Reference will now be made to the accompanying drawings, which are not necessarily drawn to scale, and wherein:

FIG. 1 is a block diagram illustrating an exemplary, non-limiting embodiment of a communications network in accordance with various aspects described herein.

FIG. 2E is a block diagram illustrating an example, non-limiting embodiment of a simple radio module functioning with the communication network of FIG. 1 and the MIMO communication system of FIG. 2A in accordance with various aspects described herein.

FIG. 2G depicts a graphical representation of an example of the phase encoding of the received RF signal applied to a simulated I-Q radio module of FIG. 2G.

FIG. 2H depicts a graphical representation of output I and Q signals according to a simulation performed on the I-Q radio module of FIG. 2G.

FIG. 2I is a block diagram illustrating an example, non-limiting alternative embodiment of an I-Q radio module functioning with the communication network of FIG. 1 and the MIMO communication system of FIG. 2A in accordance with various aspects described herein.

FIG. 3 is a block diagram illustrating an example, non-limiting embodiment of a virtualized communication network in accordance with various aspects described herein.

DETAILED DESCRIPTION

Figure 2A:
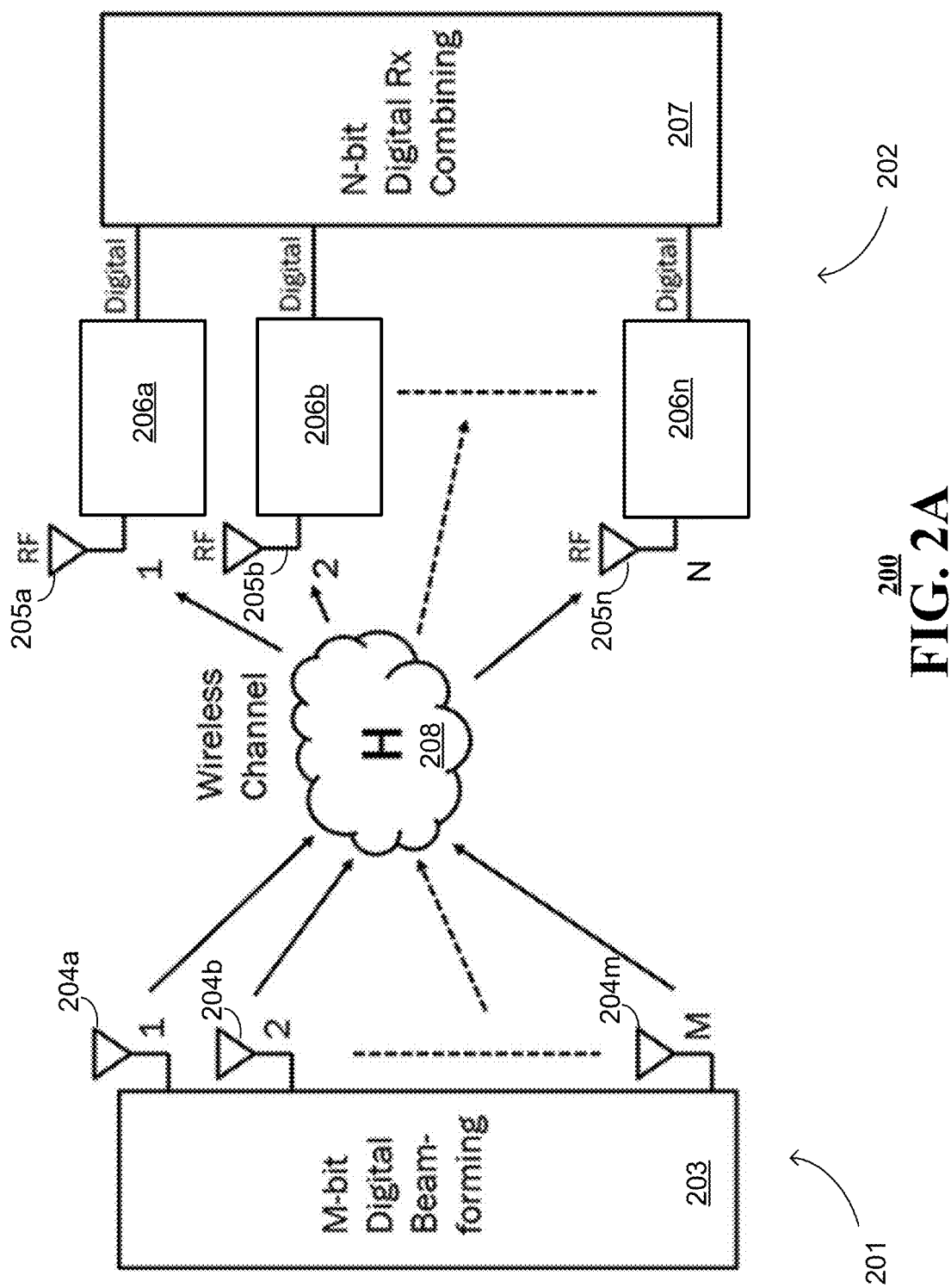
FIG. 2A is a block diagram illustrating an example, non-limiting embodiment of a MIMO communication system functioning within the communication network of FIG. 1 in accordance with various aspects described herein.

The subject disclosure describes, among other things, illustrative embodiments for wireless communications systems in general, and to next-generation wireless communications systems with high-dimensional, low-resolution architectures for power-efficient wireless communications in particular. Other embodiments are described in the subject disclosure.

One or more aspects of the subject disclosure include a receiver device that includes A radio receiver, including a local oscillator (LO) adapted to provide an LO signal. The LO generates a prominent LO frequency that approximates a carrier frequency of a received RF signal, the received RF signal having a carrier wave component operating at the carrier frequency within a millimeter wave spectrum and an information component, wherein the information component is based on a phase shift keying (PSK) modulation of the carrier wave component. The receiver device also includes an RF signal combiner that includes a first RF input port adapted to accept the received RF signal, a second RF input port coupled to the LO and a baseband output port. The signal combiner is adapted to combine, without multiplication, the RF signal and the LO signal to obtain a first combined output signal. In at least some embodiments, the receiver device includes a non-linear energy detector in communication with the baseband output port and adapted to generate a detected baseband signal based on the first combined output signal. An amplitude of the detected baseband signal corresponds to an in-phase portion of the RF signal, which conveys information of the information component.

One or more aspects of the subject disclosure include a multiple input multiple output (MIMO) radio, including an LO adapted to provide an LO signal that includes an LO frequency that approximates a carrier frequency of a received wireless MIMO signal. The received MIMO signal has a carrier wave component operating at the carrier frequency within a millimeter wave spectrum and an information component, wherein the information component is based on a PSK modulation of the carrier wave component. The MIMO radio further includes multiple radio modules, each adapted to provide a respective low-resolution output signal responsive to the received wireless MIMO signal. Each of the radio modules includes a respective RF signal combiner that includes a first RF input port adapted to accept a respective received RF signal responsive to the received wireless MIMO signal received via the wireless channel. Each of the radio modules further includes a second RF input port coupled to the LO and an output port. The signal combiner is adapted to combine, without multiplication, the RF signal and the LO signal to obtain a respective combined output signal. Each of the radio modules further includes a respective envelope detector communicatively coupled to the respective baseband output port. The respective envelope detector is adapted to detect, via the respective combined output signal, information modulated onto the received wireless MIMO signal prior to transmission via the wireless channel, to obtain a respective detected baseband signal. An amplitude of the respective detected baseband signal corresponds to an in-phase portion of the RF signal. The MIMO radio further includes a digital processor communicatively coupled to the plurality of radio modules and adapted to determine an estimate of the information modulated onto the received wireless MIMO signal prior to transmission according to the respective digital signal of each of the plurality of radio modules.

One or more aspects of the subject disclosure include a process that includes receiving an RF signal to obtain a received RF signal having a carrier wave component operating at a carrier frequency within a millimeter wave spectrum and an information component based on a PSK modulation of the carrier wave component. The process further includes obtaining an LO signal including an LO frequency, wherein the LO frequency approximates the carrier frequency, and combining, without multiplication, the received RF signal and the LO signal to obtain a first combined output signal. The in-phase portion of the first output signal is detected from the first combined output signal via a non-linear energy detector to obtain a first detected signal. An amplitude of the first output signal corresponds to an in-phase portion of the RF signal, wherein the first output signal comprises information of the information component.

High-resolution, high peak-to-average-power communication modulation formats such as OFDM (LTE) have traditionally required both the base station (BS) and user equipment (BE) to maintain a high degree of linearity. An imposition of such linearity requirements, however, limits efficiencies and indirectly a maximum practical power output of a transmitter. Such linearity requirements have also necessitated any mixing circuits as may be used in either transmit or receive operation, to incorporate high-powered local oscillators. Linearity in gain stages and low noise amplifiers is also paramount. This ultimately results in a system with inefficient amplification and high-power requirements. In a massive MIMO deployment scenario, the power consumption of the transceiver system scales roughly linearly with the number of transmitter/receiver (Tx/Rx) elements, which can prove impractical for systems employing high peak-to-average power ratio modulations requiring traditional highly-linear design. This downside is further compounded in the phased array system, which employs high-resolution complex amplitude control, typically in the RF chain, to achieve beamforming at the expense of power consumption and efficiency.

The example embodiments disclosed herein use low-resolution, e.g., single-bit or perhaps a few bit, transmitters and/or receivers and/or transceivers as means of relaxing the linearity and power requirements of next-generation wireless communications. An easily replicable, low power, low cost, RF-in, bits-out one-bit receiver cell forms the basic building block of a nonlinear MIMO cellular system. This transceiver architecture enables simple beamforming in the digital domain.

The devices, systems and techniques disclosed herein may be applicable to any wireless communications application, but are particularly suitable for high-frequency cellular communications operating at frequencies within K-band and above K-band, at which the propagation characteristics of microwave and millimeter-wave signals typically rely on high-gain antennas and encourage spatial multiplexing. The inherent spectral inefficiency of low-resolution modulation schemes becomes less of a concern when fewer end users are sharing identical space-bandwidth. Additionally, as the carrier frequency increases, solid-state amplifiers are less able to provide gain due to transistor parasitics, which result in a finite maximum operating frequency that further increases complexity and power consumption for a given output power. At least one counterintuitive technique disclosed herein is to operate one or more RF signal processing devices, such as LOs, signal combiners, square law detectors and/or transistor amplifiers in their most efficient nonlinear regime to reduce power consumption.

The illustrative examples provided herein include ultra-low-power, low-complexity, scalable radio receivers, such as the example MIMO radio cells. These radio cells exploit nonlinearities in their devices and/or circuits to obtain very low power consumption and ease of fabrication in a variety of technologies for wide bandwidths and at very high carrier frequencies. Such radio cell may include a receiver or a transmitter or receiver and transmitter. In at least some embodiments, the radio cell is configured to demodulate or to modulate or to modulate and demodulate a single bit, or perhaps a few bits, e.g., two bits per symbol. If more bits are used, then it is possible to modulate the carrier's amplitude (in addition to the phase modulation already mentioned) to achieve low-resolution complex (I/Q) modulation. At least some of the illustrative example radio cells disclosed herein include energy detectors, such as envelope detectors and/or square law detectors that utilize detection directly from a received RF carrier, without requiring down-conversion and/or the use of mixers and/or local oscillators, such as U.S. patent application Ser. No. 16/988,103, entitled "Ultra-Low-Power Millimeter-Wave to Baseband Receiver Module for Scalable Massive MIMO," which is incorporated herein by reference in its entirety. Other illustrative example radio cells disclosed herein include signal combiners adapted to convert phase modulated signals, e.g., PSK signals, to amplitude modulated signals, e.g., pulse amplitude modulated signals suitable for detection by energy detectors, such as the aforementioned envelope detectors and/or square law detectors. Beneficially, such single-bit receivers and/or transmitters and/or transceivers relax linearity and power requirements of next-generation wireless communications. The simple radio cells disclosed herein are low power, low cost, easily replicable RF-in, bits-out, low-bit receivers, e.g., one-bit receivers, that form basic building block of a non-linear MIMO cellular system. It is understood that, without limitation, such transceiver architectures enable simple beamforming in the digital domain.

Referring now to FIG. 1, a block diagram is shown illustrating an example, non-limiting embodiment of a communications network 100 in accordance with various aspects described herein. For example, communications network 100 can facilitate in whole or in part receiving, by a first radio module at a first location, a wireless MIMO signal, to obtain a first received RF signal. The wireless MIMO signal includes information originating at a remote MIMO transmitter and conveyed via a wireless channel. An envelope of the first received RF signal is detected by the first radio module without requiring a local oscillator, to obtain a first detected baseband signal. The first detected baseband signal is compared to a reference value to obtain a first digital signal that is provided to a digital processor. The digital processor also obtains a second digital signal from a second radio module receiving the wireless MIMO signal at a second location and determines an estimate of the information originating at the remote MIMO transmitter according to the first and second digital signals. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text, and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In at least some embodiments, the base station or access point 122 may be adapted to include a low-power radio, such as a low-power MIMO radio 182, having a PSK transmitter, and/or an PSK receiver and/or an PSK transceiver according to the low-power, low-complexity radios and related devices disclosed herein. Likewise, in at least some embodiments, the mobile devices 124 and vehicle 126 may be adapted to include a low-power radio, such as a low-power MIMO radio, 183a, 183b, 183c, generally 183, having a PSK transmitter, and/or an PSK receiver and/or an PSK transceiver according to the low-power, low-complexity radios and related devices disclosed herein.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIG. 2A is a block diagram illustrating an example, non-limiting embodiment of a MIMO communication system 200 functioning within the communication network of FIG. 1 in accordance with various aspects described herein. According to the illustrative example, the MIMO communication system 200 includes a transmitter portion 201 and a nonlinear receiver portion 202. The transmitter portion 201 includes an M-bit digital beamforming system 203 in communication with M antennas or radiating elements 204a, 204b, . . . , 204M, generally 204. The receiver portion 202 includes N antennas 205a, 205b, . . . , 205N, generally 205. Each of the antennas 205 is coupled to a respective radio receiver 206a, 206b, . . . , 206N, generally 206, which are coupled, in turn, to an N-bit digital receiver processing system 207. Wireless communication signals propagate between the transmitter portion 201 and the receiver portion 202 via a wireless channel 208.

The example nonlinear receiver portion 202 uses an RF-in, bits-out approach that is well-suited for a low-cost, low-power solution to the scaling problem that arises in massive MIMO. The receiver portion 202 may include one or more highly efficient antenna-coupled nonlinear amplifiers and one or more low-power RF signal processing elements that may include detector elements. Low-power RF signal processing elements may include, without limitation, power dividing/summing devices, such as Wilkinson power dividers, local oscillators operating at low power and/or nonlinear rectifying elements, e.g., diodes, that facilitate a direct-to-baseband demodulator, sometimes referred to as an on-off-keying (OOK) demodulator. The low-powered LO, when applied to a mixer, is sometimes referred to as a starved mixer. By combining a received PSK-modulated RF signal with an LO signal operating at the RF carrier, the PSK signal can be converted to one or more PAM signals, e.g., I and/or I and Q PAM signals. The resulting PAM signals are provided to a detector element to obtain baseband output signals. In at least some embodiments, baseband signals can be digitized, e.g., using a comparator that may be configured with a fixed and/or an adjustable threshold upon which comparisons are determined.

It is understood that in at least some embodiments baseband processing may occur prior to digitization. For example, one or more of gain, filtering and/or attenuation may be applied to one or more of the baseband signals. Filtering may include passive filtering and/or active filtering. In a massive MIMO deployment, the digital outputs of each nonlinear receiver chain may be further processed in a digital domain to achieve an enhanced, and ideally a maximum channel capacity. In a full-rank channel, capacity saturates with the number of transmitters, assuming more receivers than transmitters, one-bit-per-transmitter as the signal to noise ratio increases. Consequently, more than one bit-per-channel use may be achieved as a number of transmitter and receiver chains increase; this is exemplified by the trivial case of M single-input-single-output (SISO) channels with one transmitter and one receiver, which can achieve M bits-per-channel use.

Although the illustrative examples disclosed herein refer to envelope detection or OOK, it is understood that other communication techniques may be used. For example, information may be impressed upon a transmitted RF according to a different modulation, such as phase modulations, e.g., PSK and/or differential PSK (DPSK). In such applications, the receivers disclosed herein may be adapted as disclosed herein to perform detection to obtain baseband signals according to the type of modulation applied to the RF signal. Such applications may use well established techniques, such as DPSK, energy thresholding or a combination thereof.

Figure 2B:
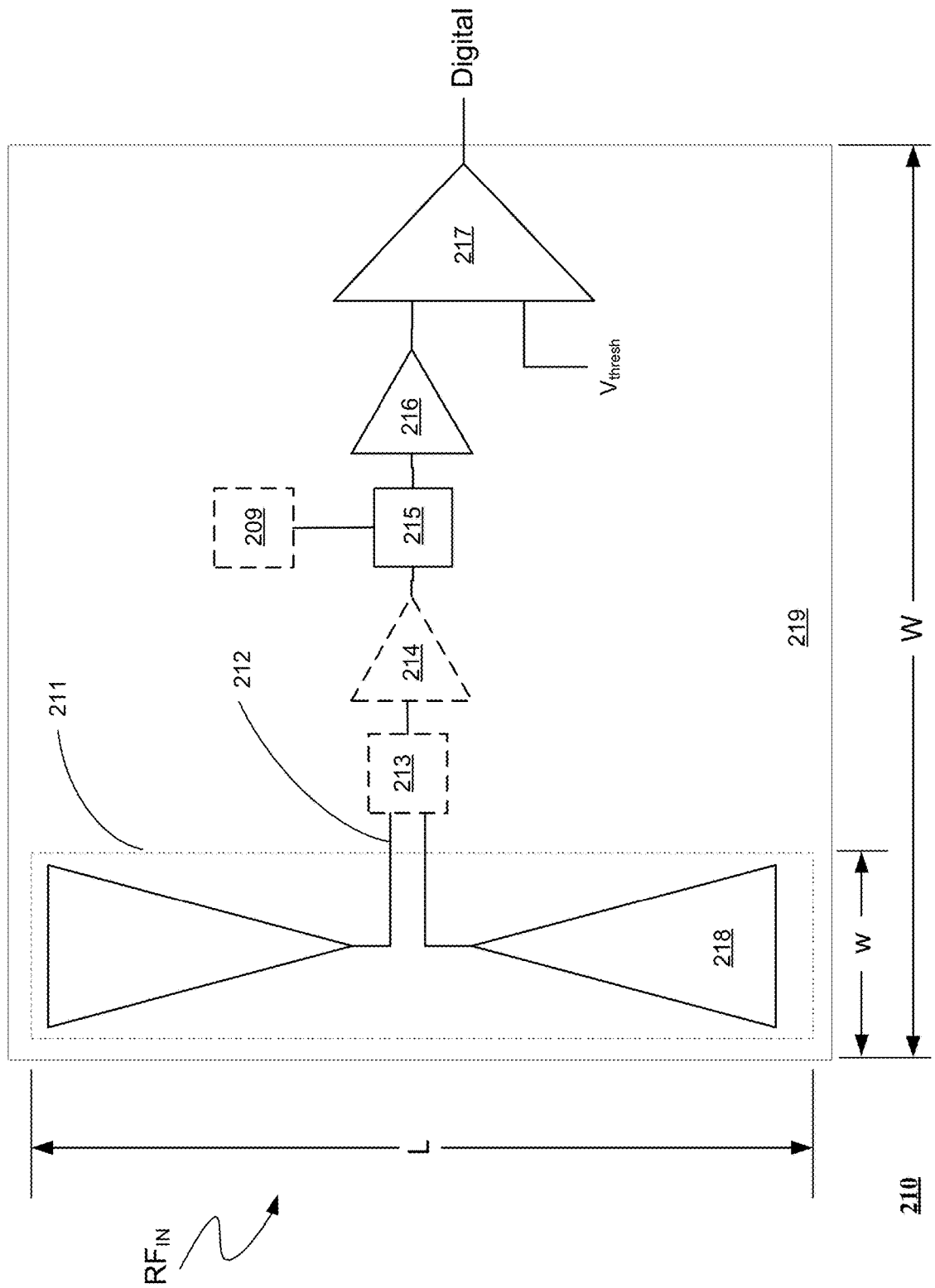
FIG. 2B is a block diagram illustrating an example, non-limiting embodiment of a MIMO radio functioning within the communication network of FIG. 1 and the MIMO communication system of FIG. 2A in accordance with various aspects described herein.

FIG. 2B is a block diagram illustrating an example, non-limiting embodiment of a MIMO radio module or cell 210 functioning within the communication network of FIG. 1 and the MIMO communication system of FIG. 2A in accordance with various aspects described herein. The example MIMO radio cell 210 includes at least one antenna 211, an RF signal processing/detection module 215, a baseband amplifier 216, and an ADC, e.g., a 1-bit ADC 217. In at least some embodiments, the MIMO cell 210 includes one or more of an antenna coupler 213 and an RF amplifier 214 (both shown in phantom). It is understood that some embodiments may not require a separate antenna coupler 213. Alternatively or in addition, at least some embodiments may not require an amplifier 214. Depending on the desired degree of baseband analog processing, some embodiments may not require the baseband amplifier 216. For example, a minimal MIMO radio module may include an antenna 211, an RF signal processing/detection module 215 and a 1-bit ADC, without necessarily requiring one or more of the antenna coupler 213 or the RF amplifier 214 and baseband amplifier 216.

In at least some embodiments, the RF signal processing/detection module 215 receives an LO signal to facilitate detection of PSK and DPSK signals. In some embodiments, the MIMO radio cell 210 includes an LO 209 (shown in phantom) that provides an LO signal operating at a carrier wave frequency of the received RF signals. The LO 209 is operated in a low-power configuration, resulting in a so-called "starved" mixer, in which the LO signal level biases a nonlinear element such as a diode well below the threshold voltage/built-in potential., e.g., a diode, of a mixer and/or a signal detector to which the LO signal may be applied. In some embodiments, the LO 209 is integral to the RF signal processing/detection module 215. Alternatively or in addition, the LO 209 may be separate from the RF signal processing/detection module 215, but integral to the MIMO radio cell 210. It is envisioned that in at least some embodiments, a single LO module 209 may supply an LO signal to more than one such RF signal processing/detection modules 215 and/or to more than one MIMO radio cells 210. In some embodiments, the LO 209 may be phase locked to the received RF signal, e.g., using feedback control, such as a phase locked loop (PLL). Alternatively or in addition, the LO 209 may operate without necessarily being phase locked to the RF signal, e.g., without an application of feedback control to further simplify the radio architecture.

Due to the very large bandwidths available in millimeter wave spectrum, digital-to-analog converters (DAC) and ADCs must work at very high sampling rates. Since their power consumption scales approximately linearly in the sampling rate and exponentially in the number of bits per sample, only very few data converters are employed in state-of-the-art systems and a base station with hundreds of antenna elements may only have a handful of data converters. Unlike fully analog beamforming systems, where phase and amplitude can individually be controlled per antenna element, limiting the number of data converters compromises robustness and mobility rendering millimeter wave spectrum less attractive for new use cases such as ultra-reliable low latency communications (URLLC).

Such simplified, or minimal complexity MIMO radio cells 210 offer several advantages. For example, a minimally complex module or cell may occupy a relatively small area of a MIMO receiver portion 202. Space savings may be advantageous for mobile device applications, e.g., for a mobile phone, a tablet, a PC, for appliance applications, such as smart TVs, and/or Internet of Things (IoT) devices, e.g., home appliances, printers, security system components, surveillance cameras, residential controllers, personal assistants, cloud-based voice service appliances, and the like. In the illustrative example, the dipole antenna 218 has a maximum dimension determined by its length, L. The example MIMO radio cell 210 occupies an area defined by the dipole antenna length L, and a module width, W. In at least some embodiments (possibly with a LO generated elsewhere), the width W is less than the length L, i.e., W<L, such that an area occupied by the module is less than a square of the maximum antenna dimension, i.e., $A=L \times W \le L^2$.

Dimensions of an antenna, such as the example dipole antenna 218, which happens to be a bowtie type of dipole antenna adapted to provide a relatively wide operational bandwidth, may be determined from an antenna calculator. For example, a length L may be determined according to: $L=0.75\lambda$. Likewise, a width w may be determined according to $w=0.25\lambda$. For example, the MIMO radio cell 210 configured to operate in the Ka band, having a frequency between about 26.5-40 GHz, and a corresponding free-space wavelength between about 11.1 and 7.5 mm. Assuming operation at a center frequency of about 33 GHz, the free-space wavelength is about 9.1 mm, may have a length $L \approx 6.8$ mm and a width $w \approx 2.3$ mm. Accordingly, an area occupied by a Ka band MIMO radio may be less than about 7 mm$\times$7 mm$\approx$50 mm$^2$.

Other advantages of simplified, or minimal complexity MIMO radio cells 210 include relatively low power requirements and relatively low thermal load. According to the examples disclosed herein, the MIMO radio cells 210 use simple energy detectors, such as envelope detectors, or square law detectors. Such simple detectors may operate on the received RF signal directly without requiring any local operator and/or mixing to obtain an intermediate frequency between RF and baseband, as would be typical for millimeter wave digital communication systems. Rather the simple detectors may obtain a baseband signal directly from the RF signal according to an envelope of the RF signal and/or from a PSK and/or DPSK type receiver employing a low powered LO in combination with a nonlinear device providing a mixing of the RF and the LO. Moreover, the low-resolution, e.g., single-bit, ADC may be operated in a nonlinear region, e.g., using a simple comparator circuit, without requiring high-resolution, linear ADCs, as would be typical for millimeter wave digital communication systems. Still further, should signal amplification be used, e.g., providing an LNA 214 between the antenna 218 and the RF processing/detection module 215, the LNA 214 does not need to be operated in a linear region. As the low-resolution ADC solution relies upon a simple comparator circuit 217, linearity of the received signal does not need to be preserved. Accordingly, the amplifier, e.g., LNA 214, may be operated in a nonlinear region, e.g., in saturation. As is true with operation of the low-power LO 209, it is understood that operation of an amplifier, e.g., LNA 214, without regard to preserving linearity, e.g., in saturation, may be accomplished a substantially less power dissipation that would be required for linear operation. Likewise, operating the minimal complexity MIMO radio cell 210 requires relatively low power, certainly much less than traditional digital communication receivers operating in comparable wavelengths. Consumption of less power results in generation of less of a thermal load, e.g., according to component inefficiencies, power requirements and/or circuital resistive losses.

Beneficially, the factors contributing to smaller, simpler and cooler MIMO receiver modules also reduce initial costs as well as operational costs, e.g., lower power consumption and cooling. The reduced module size and reduced thermal load further allows more MIMO receiver modules to be used in the same space than would otherwise be possible with traditional MIMO receivers employing higher-resolution ADCs, and/or LNAs operating in their linear regions, digital receivers and/or detectors employing traditional LO-mixer combinations, e.g., not starved, but rather operating in a linear region. The reduced cost, thermal load and size permit larger numbers to be used within the same footprint, which is well adapted for massively MIMO systems. It is envisioned that massively MIMO systems may employ scores, if not hundreds, or even more MIMO receiver modules.

The example MIMO radio cell 210 includes a dipole antenna 218—in this instance, a bowtie antenna 218. It is understood that in general the antenna 211 may include a balanced structure, such as a dipole, an unbalanced structure, such as a monopole, and/or a patch. The antenna may be a resonant structure, such as the example dipole antenna 218, having a length L that approximates one-half of an operating wavelength ($\lambda$), i.e., $L \approx \lambda/2$. Without limitation, the antenna 211 may include an electric-field sensing element, a magnetic-field sensing element, or a combination of both an electric-field and a magnetic-field sensing elements. By way of non-limiting example, it is understood that antenna 211 may include a wire structure, such as a dipole, a monopole, or a loop. It is understood that a loop antenna 211 may be configured according to varying geometries, e.g., a circular loop, an elliptical loop, a square loop, and a rectangular loop. A wire structure antenna 211 may be free-standing, e.g., formed from a rigid conductor and/or formed on a substrate 219 and/or similar supporting structure. The antenna 211 may be substantially omnidirectional, such as the example dipole 218 structure. Alternatively or in addition, the antenna 211 may offer some directivity.

It is understood further that the antenna 211 may operate according to a preferred polarization, such as a linear polarization, a circular polarization, or more generally, an elliptical polarization. By way of example, the dipole antenna 218 may be replaced with a crossed dipole, in which two dipole antennas are positioned in an orthogonal arrangement and coupled to a common antenna terminal 212 via a phase shifting element, e.g., a 90-degree phase shifter. Still other antenna 211 may include antenna arrays, such as Yagi antenna arrays, log-periodic structures, spiral antennas and the like.

The antenna coupler 213 is positioned between the antenna terminal 212 and the RF processing/detection module 215. For embodiments, in which a gain element, such as the example LNA 214 is included, the antenna coupler 213 may be positioned between the antenna terminal 212 and the LNA 214. In at least some embodiments, the antennal coupler 213 is positioned at the antenna terminal 212. The antenna coupler 213 may include a matching network, such as a conjugate matching network matching a driving point impedance of the antenna 211 to a characteristic impedance of a transmission line extending between the antenna coupler 213 and one or more of the gain element 214 and the RF processing/detection module 215.

Alternatively or in addition, the antenna coupler 213 includes a balun. The balun is adapted to facilitate a coupling of a balanced structure, such as the example dipole antenna 218 and an unbalanced structure, such as an unbalanced transmission line. Baluns can facilitate operation of a balanced device, such as the example dipole antenna 218 by promoting a substantially symmetric current distribution between each half of the dipole antenna 218. Baluns may include one or more of transmission lines, lumped elements, e.g., capacitors and/or inductors, including transmission line elements, e.g., $\lambda/4$ transmission line segments, and the like. In at least some embodiments, the balun structure may include a lossy element, such as a ferrite element and/or RF chokes adapted to absorb and/or otherwise prevent propagation of unbalanced currents.

In at least some embodiments, the MIMO radio cell 210 includes one or more filters. Filters may include, without limitation, high-pass filters, low-pass filters and band-pass filters. In at least some embodiments, filters may be analog filters, e.g., constructed according to lumped resistor and/or inductor and/or capacitor components. Alternatively or in addition, analog filters may utilize one or more waveguide segments, such as waveguide lengths, shorted waveguide stubs and/or open waveguide stubs positioned at predetermined lengths along a waveguide, and the like. One or more filters may be provided, for example, at one or more of the antenna terminal 212, the antenna coupler 213, an input of the LNA 214, and output of the LNA, an input of the RF processing/detection module 215 and/or at the output of the RF processing/detection module 215, and/or the output of a baseband processing stage, such as the example baseband amplifier 216. In some embodiments the filters may be high-pass filters adapted to block DC currents. Alternatively or in addition, the filters may be low-pass filters adapted to pass baseband currents.

The RF processing/detection module 215 may include any device having a non-linear characteristic curve, e.g., a non-linear current-voltage (I-V) curve. Examples include, without limitation, a diode, a transistor, e.g., a transistor wired in a diode configuration. In practical applications, parasitic values of the detector may be selected to ensure minimal signal degradation resulting from operation of the detector device at the frequencies of operation, e.g., at the RF the carrier frequency and/or the baseband frequency.

In some embodiments, the MIMO receive cell 210 may include a baseband amplifier 216 designed to amplify the baseband signal from the output of an envelope detector of the RF processing/detection module 215 to a suitable voltage/current/power level as required by comparator ADC 217. The amplifier 216 may also act as an impedance-transforming buffer stage between the RF processing/detection module 215 and comparator 217.

The comparator may include any suitable device to provide a stable binary output according to a comparison of an input baseband signal to a reference value. For example, the reference value may be a reference voltage. A value of the reference voltage may be selected to serve as a decision between a binary 1 or a binary 0. For example, if an expected voltage of a received baseband signal is expected to be 0 and 10 microvolts, a threshold value may be selected as ½ the maximum value, i.e., about 5 microvolts. In at least some embodiments, the threshold voltage is determined according to a minimum signal level, e.g., a system noise floor, in which a received voltage above a predetermined value above the noise floor may represent a binary 1. In some embodiments, the threshold value is fixed. Alternatively or in addition, the threshold value may be variable, e.g., according to signal conditions, noise, conditions, a calibration value, and so on.

As an example, assume a simplified passive embodiment of receiver MIMO 210 that omits amplifiers 214 and 216. Further assume that the system is impedance matched and the noise seen at the comparator is solely due to thermal noise generated in the envelope detector. It is well-known that thermal noise in passive systems exhibits a flat spectral power density of −174 dBm/Hz. If the system bandwidth is 1 GHz, the corresponding noise power is −84 dBm. Suppose that the input power to the system is −50 dBm (for signal symbol 1) and the aggregate loss from antenna 218, coupler and/or filter 213, amplifier 214, and RF processing/detection module 215 is 20 dB. This corresponds to an output power of approximately −70 dBm at the input comparator 217. Since the SNR is relatively high (14 dB), one-half the signal voltage at comparator 217 will approximately lie halfway between the noise floor voltage and signal on-state. From a voltage standpoint, halving the voltage reduces power by one-fourth, which corresponds to a threshold power of −76 dBm. Assuming a 50-Ohm input impedance, this corresponds to a threshold voltage of approximately 35 µV. In the event that the comparator hardware 217 is unable to detect voltage differences this low, because of, e.g., built-in hysteresis, it will be of benefit to instate baseband amplifier 216 to accommodate lower input power operation. One potential strategy for adjusting the threshold is feedback based on individual digital outputs, i.e., if the comparator 217 is outputting all binary 1's, the comparator threshold may be set too low and should be increased.

If a pre-amplifier at millimeter-wave is included, then the link budget would improve significantly due to the square-law device. That is, if the power incident upon the receive cell is −70 dBm and the millimeter-wave LNA gain is 30 dB, with a diode responsivity of 10 kV/W this corresponds to a 1 mV baseband output voltage. Even this is likely too low to pass along to a standard CMOS threshold detector which would have noise and hysteresis. Therefore a baseband voltage amplifier with e.g., 10 V/V gain might be used. The baseband amplifier would have high input impedance (e.g., greater than the diode video resistance over the channel bandwidth of ~1 GHz, as an example). It would also have relatively low output resistance in order to pass a multi-GHz signal across the input capacitance of a CMOS threshold detector IC (perhaps 500 ohms output resistance or less).

Figure 2C:
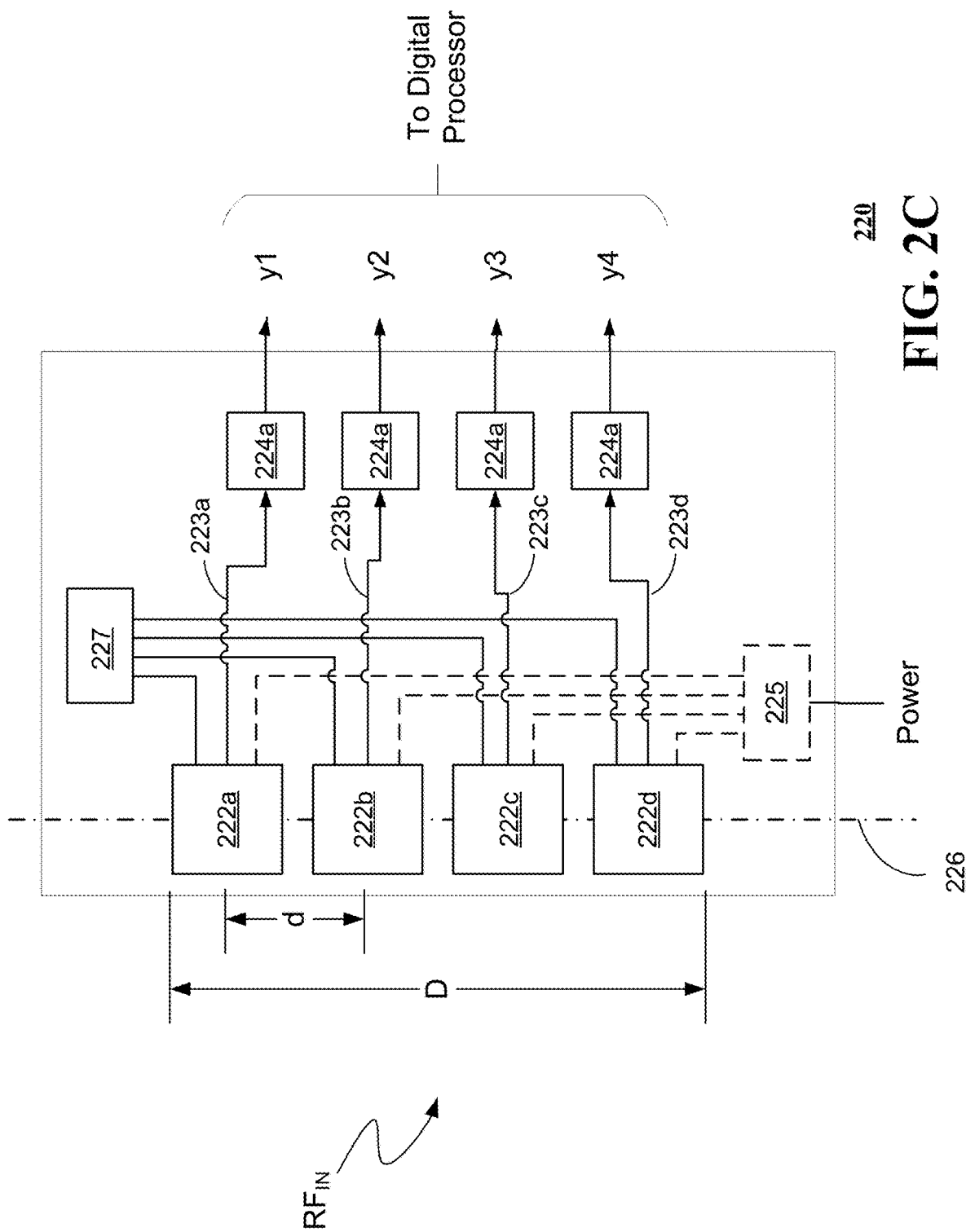
FIG. 2C is a block diagram illustrating an example, non-limiting embodiment of a MIMO radio module functioning within the communication network of FIG. 1 and the MIMO communication system of FIG. 2A in accordance with various aspects described herein.

FIG. 2C is a block diagram illustrating an example, non-limiting embodiment of a MIMO radio module 220 functioning within the communication network of FIG. 1 and the MIMO communication system of FIG. 2A in accordance with various aspects described herein. The example MIMO radio module 220 includes four RF signal processing/detection cells, 222a, 222b, 222c, 222d, generally 222. It is understood that other numbers of RF signal processing/detection cells 222 may be used within a MIMO radio module 220, including numbers greater than and/or less than four. Such numbers may be selected based on one or more of power requirements, thermal loading, operating frequency range, manufacturability, size constraints, cost, complexity, reliability, and so on. Each of the RF signal processing/detection cells 222 is coupled to a respective interconnect or terminal 224a, 224b, 224c, 224d, generally 224, via a respective transmission line 223a, 223b, 223c, 223d, generally 223. The terminals 224 may include an electrical interconnect adapted for repeated connections and disconnections, e.g., a connector, such as a coaxial connector, a push-pin connector, and the like. Alternatively or in addition the terminals 224 may include more permanent electrical interconnects, such as solder pads.

According to the illustrative example, a respective digital signal and/or digital values y1, y2, y3, y4 is available and/or otherwise accessible at each terminal 224 of the group of terminals 224. The digital signal and/or value y1, y2, y3, y4 may be equivalent to an output of the comparator 217 (FIG. 2B) of each cell 222. The digital signals/values y1, y2, y3, y4 are provided to a digital signal processor (not shown) for combination and/or digital processing. At least one example digital signal processor is the N-bit digital receiver processing system 207 (FIG. 2A).

The RF signal processing/detection cells 222 may be identical cells, e.g., according to the example MIMO radio cell 210 (FIG. 2B). Alternatively, the RF signal processing/detection cells 222 may differ, e.g., some RF signal processing/detection cells 222 adapted for one portion of an RF spectrum, while other cells 222 are adapted for another portion of the RF spectrum. Alternatively or in addition, some RF signal processing/detection cells 222 may be adapted for one polarization, e.g., linear horizontal, while other RF signal processing/detection cells 222 are adapted for another polarization, e.g., linear vertical. Some RF signal processing/detection cells 222 may be adapted to include LNAs 214, while other RF signal processing/detection cells 222 may not. For example, those RF signal processing/detection cells 222 without LNAs 214 may operate in a passive mode when signal conditions permit, e.g., relative strong received signal levels, relatively low interference and/or favorable channel conditions. Other RF signal processing/detection cells 222 with the LNAs 214 may be selectively engaged and/or otherwise activated according to unfavorable signal conditions, e.g., relative weak received signal levels, relatively high interference and/or unfavorable channel conditions. Such different cells may be arranged on the same MIMO radio module 220, e.g., interspersed, and/or arranged in groups.

It is envisioned that in at least some embodiments, all of the RF signal processing/detection cells 222 of a particular MIMO radio cell 210 may be adapted for one type of RF signal modulation, e.g., OOK and/or PSK and/or DPSK, and the like. It is envisioned further that in at least some embodiments one or more different types of MIMO radio cells 210 may be used within a common MIMO radio application. For example, a MIMO radio may include one or more MIMO radio cells 210 adapted for OOK modulation and one or more other MIMO radio cells 210 adapted for PSK modulation. Alternatively or in addition, a single MIMO radio cells 210 may include one or more different types of RF signal processing/detection cell 222, e.g., with at least one RF signal processing/detection cell 222 adapted for PSK and/or DPSK modulation, and at least one other RF signal processing/detection cell adapted for OOK modulation. It can be appreciated that such mixed mode configurations can offer flexibility in operation and/or application. As material and/or fabrication costs are anticipated to be relatively low in view of the simple, low-complexity architectures, and as dimensions of any realizable modules amenable to compact systems, such mixed mode constructions may be used despite there being any immediate need for mixed mode operation. Namely, a mixed mode device may be deployed, but only operated according to one of multiple available modes.

Alternatively or in addition different MIMO radio modules 220 may be combined within a common receiver portion 202 (FIG. 2A). For example, a first group of MIMO radio modules 220 may include passive detectors, e.g., without LNAs 214, while a second group of MIMO radio modules 220 may include active detectors, e.g., including LNAs 214. Other parameters, such as antennas, matching networks and/or filters, when provided, may differ within the same MIMO radio module 220 and/or according to the different groups of MIMO radio modules.

In at least some embodiments, one or more of the cells 222 may include an active element, such as an LNA 214, and/or an LO 209 and/or a comparator 217 (FIG. 2B). In such instances, each of the cells 222 may require electrical power, e.g., according to one or more voltage levels. It is envisioned that in at least some embodiments, the electrical power, e.g., the one or more voltage levels may be provided by one or more power supplies 225 provided at the MIMO radio module 220. Alternatively or in addition, one or more voltage levels may be provided by a separate power source, such as a stand-alone power supply. In such configurations, the MIMO radio module 220 may include a power interconnect, e.g., a connector, adapted to interconnect to a remote power source. Conductors, e.g., traces, may be provided from contacts of a power connector to each of the cells 222. In at least some embodiments, a single LO 227 may supply an LO signal to one or more of the cells 222, as illustrated. It is understood that in at least some embodiments, the LO may be integral to the MIMO cell 220. In such instances, the LO may also obtain power from the power supply 225. Alternatively or in addition, the LO may be supplied separately from the MIMO cell 220.

According to the illustrative example, the MIMO radio cells 222, including antennas 211 (FIG. 2B), are spaced according to a center-to-center distance d. Depending upon a size and/or shape of the cells, there may be a separate distance between adjacent cells, as shown. However, it is envisioned that in at least some embodiments, the cells 222 may be adjacent to each other, such that there is no separation between adjacent cells 222. The cell spacing d may be uniform between all cells 222 of the module 220. Alternatively the cell spacing d may vary between at least some of the cells 222.

According to the illustrative example module, the cells 222 are arranged in a one-dimensional fashion, e.g., along a common linear axis 226. In some embodiments, the cells may be arranged in a two-dimensional fashion, e.g., according to a 2-dimensional (2D) pattern. The 2D pattern may be a regular pattern, in which spacings between adjacent cells 222 is uniform, e.g., constant in one or two dimensions. Example 2D patters include, without limitation, a rectangular grid, a hexagonal close pack grid, and the like. Such 3D patterns are beneficial at least in that they permit a greater number of cells 222 to be provided within a relatively compact receiver portion 202. It is envisioned that in at least some embodiments, the cells 222 may be arranged in a three-dimensional (3D) fashion, e.g., according to a conformal pattern that may conform to a 3D surface, such as a cube, a tetrahedron, a parallelepiped, a cone, or a curved surface, such as a spherical portion and/or an ellipsoidal portion.

Figure 2D:
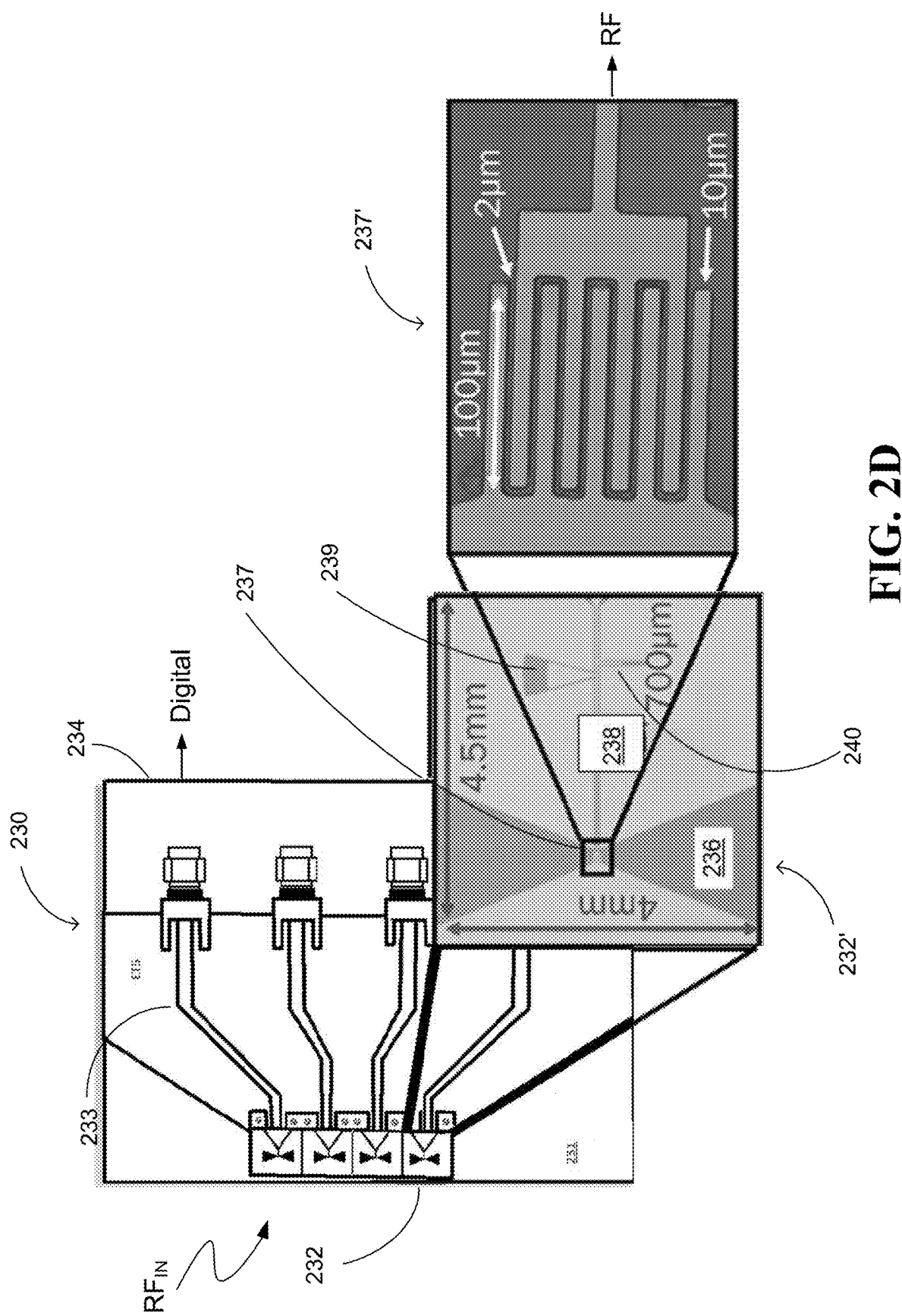
FIG. 2D is planar view of an example, non-limiting embodiment of a MIMO radio module functioning within the communication network of FIG. 1 and the MIMO communication system of FIG. 2A in accordance with various aspects described herein.

FIG. 2D is planar view of an example, non-limiting embodiment of an RF front end for a MIMO radio module 230, in this instance, a low-power, PSK and/or DPSK receiver, functioning within the communication network 100 of FIG. 1 and the MIMO communication system 200 of FIG. 2A in accordance with various aspects described herein. It is understood that in some applications, the MIMO radio module 230 may include an OOK receiver and/or a combination of different types of receivers that may be interconnected to a common and/or different antennas. The example MIMO radio module 230 includes a substrate 231 upon which the antenna cells and baseband distribution network are formed. The illustrative radio module 230 includes four radio cells 232, four connectors 234 and a baseband distribution network 233. Each radio cell 232 is in communication with a respective one of the connectors 234 via the RF distribution network 233. In operation, each radio cell 232 receives a wireless MIMO signal, detects bandpass information modulated onto the wireless MIMO signal at a remote MIMO transmitter, e.g., using OOK, PSK and/or DPSK modulation, and generates a detected baseband signal representative of the modulated RF signal. The analog signal is passed to a signal combiner, which then passes to an ADC, e.g., a comparator, then in at least some embodiments to a digital processing unit (not shown) to determine an estimate of the transmitted information originating at the MIMO transmitter. This present example embodiment may be considered a limited implementation of the MIMO receiver 210

(FIG. 2B), comprising an antenna 236, an antenna coupling/matching network 237 at antenna terminal, an RF LNA, an RF signal processing/detection module and an envelope detector.

A first inset illustrates in more detail one of the MIMO radio cells 232'. The example MIMO radio cell 232 includes a bowtie dipole antenna 236, an antenna coupler 237, an RF signal processing/detection circuit 238, a first stub tuner 239 and a second stub tuner 240. The RF signal processing/detection circuit 238 is in electrical communication with the dipole antenna via the coupler 237. A more detailed illustration of the example antenna coupler is provided in a second inset 237'. The antenna coupler 237' includes a capacitive arrangement adapted to block a transfer of low frequencies, e.g., DC, between the dipole antenna 236 and the RF signal processing/detection circuit 238. The example capacitive coupler 237' includes an inter-digitated structure extending in length to about 100 µm, with each digit of the inter-digitated structure having a width of about 10 µm, and a separation from adjacent digits of about 2 µm. The antenna coupler configuration 237' ensures that received RF signals at the approximate operating frequencies, e.g., K-band, are passed from the antenna 236 to the RF signal processing/detection circuit 238 with minimal attenuation and/or distortion.

The RF signal processing/detection circuit 238 receives an RF signal responsive to exposure of the dipole antenna 236 to a wireless MIMO signal. Thus, the RF signal will depend upon the transmitted MIMO signal as adapted by a wireless RF channel between the remote transmitter and the dipole antenna 236. To at least some extent, the RF signal will depend on a position and/or orientation of the dipole antenna 236. Accordingly, it is expected that in at least some applications, RF signals obtained by the different MIMO radio cells 232 when exposed to the same wireless RF signal may differ according to channel variances. The diode is configured to rectify the received RF signal to obtain a representation of an amplitude or envelope of the received RF signal. The stub tuners 239 and/or 240 may facilitate impedance matching of the RF signal processing/detection circuit 238 to a transmission line and/or to other circuit elements, such as the low-resolution ADC or comparator (not shown). According to the illustrated example, the first stub tuner 239 presents an open circuit at a terminal of the RF signal processing/detection circuit 238, at the RF frequency, which aids in impedance matching at the RF frequency from the antenna 236 to the RF signal processing/detection circuit 238. The second stub tuner 240 presents a reactive impedance to twice the RF frequency at a terminal of RF signal processing/detection circuit 238, which prevents leakage of the second harmonic into the baseband distribution network 233.

The length of the example dipole antenna 236 is about 4 mm. It is worth noting that the dimensions of the MIMO radio cell 232' is about 4 mm by about 4.5 mm. Namely, the dimensions of the cell 232' are substantially determined according to a size of the antenna 236 resulting in an extremely compact form factor well adapted for positioning proximate to other such cells 232 in the example MIMO radio module 230.

The substrate 231 may include any suitable substrate that supports conductive elements, such as radiating elements, i.e., antennas, transmission lines, and the like. Examples include, without limitation, dielectric substrates including one or more of glass, fiberglass, plastics, polymers, and/or semiconductors, e.g., silicon. Further example substrates include bakelite or polyoxybenzylmethylenglycolanhydride, commonly used as an electrical insulator possessing considerable mechanical strength. Other alternatives include glass-reinforced epoxy laminate sheets, tubes, rods and printed circuit boards (PCB), such as FR-4. Still other alternatives include glass reinforced hydrocarbon/ceramic laminates materials, such as RO4003® Series High Frequency Circuit Materials, PTFE laminates and glass microfiber reinforced PTFE (polytetrafluoroethylene) composite materials, e.g., RT/Duroid® laminates, produced by Rogers Corporation.

The conductive elements, such as the antennas, matching networks, filters and/or the RF distribution networks may be configured upon the substrate 231. Such conductive elements may be defined by PCB fabrication processes including without limitation one or more of chemical etching, chemical deposition, semiconductor fabrication processes, or combination of both PCB and semiconductor fabrication processes. PCB fabrication processes include, without limitation imaging desired layout on conductor, e.g., copper, clad laminates, etching or removing excess copper from surface and/or inner layers to define and/or otherwise reveal traces and/or device mounting pads, creating a PCB layer stack-up by laminating, e.g., heating and pressing, board materials at high temperatures, and the like. PCB fabrication processes may include drilling holes for mounting holes, through hole pins and vias. Semiconductor fabrication processes may include one or more of a deposition that grows, coats, or otherwise transfers a material onto a substrate, e.g., a semiconductor wafer. Available technologies include, without limitation, physical vapor deposition, chemical vapor deposition, electrochemical deposition, molecular beam epitaxy and atomic layer deposition among others.

Low-resolution, receivers with a 1-bit ADCs can be optimal in a bits/Joule-sense if the RF front-end is sufficiently low-power. The inherent nonlinearity of a 1-bit ADC permits the radio to be designed to satisfy power constraints without regard for linearity. As disclosed herein the RF front-end may be extremely low-power (even passive).

The example energy detector is configured to operate at about 38 GHz. The energy detector may incorporate a W-band zero-bias diode (ZBD), available from Virginia Diodes, in a 50-ohm co-planar waveguide (CPW) environment with 150 µm pitch pads. The CPW metal is 20 nm Ti, 480 nm Au deposited by an electron-beam evaporation liftoff process on 500-µm-thick high-resistivity ($\rho$>5 k$\Omega$·cm) silicon. A single-stub network matches the input to the ZBD, while two stubs at the output provide terminations at fc (open) and 2fc (reactive). The diode is flip-chip soldered to the pads by hotplate using low-melting-point indium alloy solder balls. Gold wirebonds (diameter 25 µm) are used to equalize ground plane potential in the CPW, especially at stub junctions.

FIG. 2E is a block diagram illustrating an example, non-limiting embodiment of a simple radio module 249 functioning with the communication network of FIG. 1 and the MIMO communication system of FIG. 2A in accordance with various aspects described herein. The example radio module 249 includes an antenna 241, a power divider/combiner 242, an LO 243 and a diode 245. The power combiner 242 includes three ports: two input ports 276a, 276b and one output port 277. In at least some embodiments, the power combiner 242 provides isolation between the input ports 276a, 276b, while also maintaining a matched condition on all three ports 276a, 276b, 277. One such class of power combiner circuits are referred to as Wilkinson power dividers. A Wilkinson power divider may use passive components, e.g., lumped elements and/or waveguide segments to achieve the signal combining. Beneficially, such devices may exhibit reciprocal functionality in that it operates as a power combiner in one direction, and a power divider in another direction. According to the illustrative example, RF signals presented at the two input ports are summed in a power sense to obtain an output provided the output port 277.

According to the illustrative radio module 249, the first input port 276a is communicatively coupled to the antenna 241, such that a received RF signal is presented at the first input port 276a of the power combiner 242. Likewise, the second input port 276b is communicatively coupled to a local oscillator 243, such that an LO signal is presented at the second input port 276b of the power combiner 242. In operation, the received RF signal and the LO signal are combined in a power summing sense to produce an output signal at the output port 277 of the power combiner 242. In a simple example, the received RF signal is a binary PSK (BPSK) modulated RF carrier wave operating at a stable carrier frequency $f_c$. The LO signal is generated to have an operating frequency $f_{LO}$ that matches the carrier frequency, i.e., $f_c = f_{LO}$.

Ignoring any phase offset, the summed signals will combine when a phase of the BPSK signal matches a phase of the LO signal to produce an in-phase output summation I of the BPSK signal and the LO signal at the output port 277. However, when a phase of the BPSK signal opposes the phase of the LO signal, the power of the input signals will be dissipated in a lossy element, e.g., a resistor 244 of the power combiner 242. A resulting output signal would appear as a pulse amplitude modulated (PAM) signal operating at the carrier frequency $f_c$, with an amplitude varying between a maximum value, i.e., a "1" and a minimum value, i.e., a "0." An envelope of the PAM signal may be detected using any square law device, such as the diode 245. It should be appreciated that in at least some embodiments, power levels of the LO signal are sufficiently low to prevent the diode from turning on, thus assuring its operation in a nonlinear region of the diode's I-V characteristic curve.

In some embodiments, the phase of the LO 243 may be configured to track the phase of the received RF signal, such that a relationship between phases, i.e., $\varphi_{ref}$ is held constant or locked, e.g., in a phase locked loop (PLL) configuration. The phase relationship may be in-phase, e.g., $\varphi_{ref}=0$, anti-phase, e.g., $\varphi_{ref}=\pi$, or held at some other constant value e.g., $\varphi_{ref}$. A phase offset other than zero, will represent a rotation of the BPSK constellation.

According to the illustrative example, the radio module 249 may be adapted to detect an absolute in-phase I portion phase of the received RF signal. Since an absolute phase of the LO 243 is known or otherwise determinable, the absolute phase of the I portion may be determined in the following manner. A voltage of the received RF signal may be represented by $V_r = \sqrt{2}A \cos \omega t$. Likewise, a voltage of the LO signal may be represented by $V_{LO} = \sqrt{2}A \cos(\omega t - \varphi_{ref})$. An output signal of the power combiner 242 may be described as [$A \cos \omega t + A \cos(\omega t - \varphi_{ref})$], which is applied to the square law device 245 to obtain an output voltage $V_0 = [A \cos \omega t + A \cos(\omega t - \varphi_{ref})]^2$, which may be low-pass filtered (LPF), in turn, to obtain a LPF output $V_0' = A^2(1 + \cos \varphi_{ref})$. The LPF filtered output $V_0'$ may, in turn, be converted to a digital signal, e.g., using a comparator 217 (FIG. 2B).

As described above, power is lost in the Wilkinson divider (combiner) 242 when a phase angle between the received RF signal and the LO signal is not an integer multiple of π. Since the incoming phase of the received RF signal $\underline{V}_r$ is random due to the wireless channel, both LO drift and channel effects can render the detector unable to discriminate phase (dissipation in the Wilkinson resistor 244). Thus, may only be able to detect an in-phase component I and not a quadrature-phase component Q. It is envisioned that in at least some embodiments, the Wilkinson resistor 244 may be replaced with a matched diode to receive a differential signal, e.g., a DPSK signal.

The antenna 241 may include any suitable antenna adapted to receive the RF signal, including any of the example antennas disclosed herein, such as the example dipole or bowtie antennas 218, 236 (FIGS. 2B and 2D). Although not shown, it is understood that in at least some embodiments, the radio module 249 may include an LNA 214 (FIG. 210), e.g., between the antenna 241 and the first input port 276a. Alternatively or in addition, the radio module 249 may include one or more matching networks 213, 237' (FIGS. 2B and 2D). Waveguides and/or transmission lines may be used to route one or more of the RF signal, the LO signal and the output signal, as may be required to accomplish signal reception, processing and detection. Waveguides and/or transmission lines may include any suitable structures, such as the example PCB transmission lines including one or more of microstrip and/or strip line structures disclosed herein.

Figure 2F:
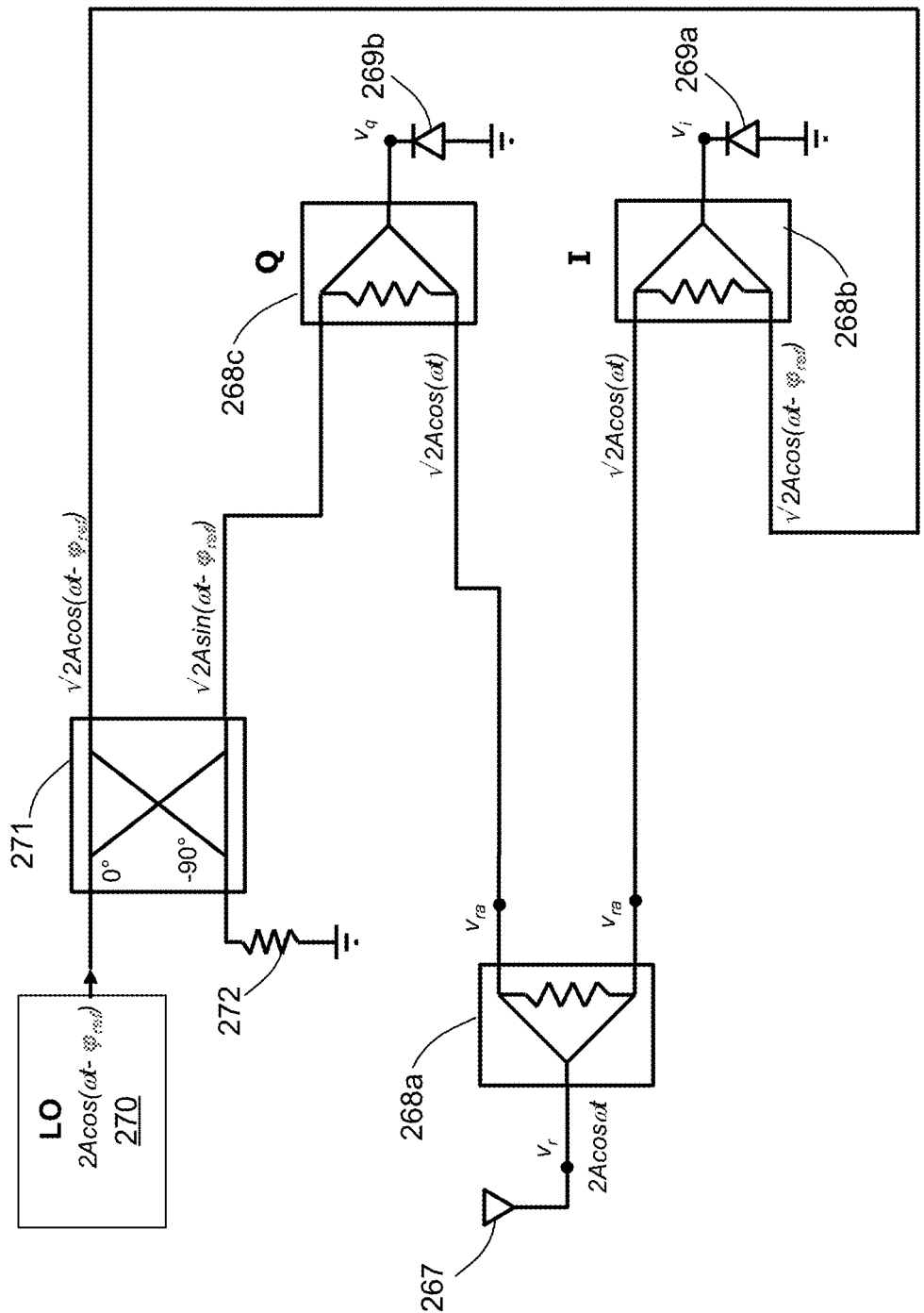
FIG. 2F is a block diagram illustrating an example, non-limiting embodiment of an I-Q radio module functioning with the communication network of FIG. 1 and the MIMO communication system of FIG. 2A in accordance with various aspects described herein.

FIG. 2F is a block diagram illustrating an example, non-limiting embodiment of an I-Q radio module 278 functioning with the communication network of FIG. 1 and the MIMO communication system of FIG. 2A in accordance with various aspects described herein. The example I-Q radio module 278 is adapted to determine an absolute phase of the received RF carrier between symbols, using a low-power LO 270. As in the preceding example, the absolute phase may be determined because an absolute phase of the LO signal is known and/or otherwise determinable.

The example I-Q radio module 278 includes an antenna 267, and a first power divider 268a. The antenna 267 is adapted to receive an RF signal, that may include a PSK modulated RF signal. The received RF signal $V_r = 2A \cos \omega t$ is applied to an input port of the first power divider 268a, which divides the received RF signal into two substantially equal output signals $V_{ra} = \sqrt{2}A \cos(\omega t)$ and $V_{ra}' = \sqrt{2}A \cos(\omega t)$.

The example I-Q radio module 278 also includes an LO 270, and a hybrid coupler 271. The LO 270 provides an LO signal $V_{LO} = 2A \cos(\omega t - \varphi_{ref})$ that is applied to a first input port of a four-port hybrid coupler 271. The hybrid coupler 271 includes a second input port that is terminated in a resistor 272. The hybrid coupler also includes two output ports. A first output port hybrid coupler 271 is in communication with a first input port of a second power combiner 268b, providing an in-phase portion of the LO signal $V_{ILO} = \sqrt{2}A \cos(\omega t - \varphi_{ref})$ to the second power combiner 268b. A second input port of the second power combiner 268b is in communication with a second output of the first power divider 268a, receiving therefrom the signal $V_{ra}'$. A combined signal $-A \cos \omega t + A \sin(\omega t - \varphi - \pi/2)$ is provided at an output of the second power combiner 268b, representing an in-phase portion. The output of the second power combiner 268b is in communication with a first diode 269a coupled between the power combiner 268b and ground. The power level of the LO 270 is determined to ensure that the diode 269a does not turn on or is otherwise operated in its nonlinear region. The mixer operated in this configuration can be referred to as a "starved" mixer. A square-law detected output is obtained at a terminal of the first shunt diode: $V_1 = [-A \cos \omega t + A \sin(\omega t - \varphi - \pi/2)]^2 = [A \cos \omega t + A$ $\cos(\omega t-\varphi_{ref})]^2$. This value can be low-pass filtered to obtain an in-phase I portion of a detected baseband signal $V_i=A^2(1+\cos \varphi_{ref})$.

Likewise, a second output port of the hybrid coupler 271 is in communication with a first input port of a third power combiner 268c, providing a quadrature-phase portion of the LO signal $V_{QLO}=\sqrt{2}A \sin(\omega t-\varphi_{ref})$ to the third power combiner 268c. A second input port of the third power combiner 268c is in communication with a first output of the first power divider 268a, receiving therefrom the signal $V_{r\alpha}$. An output of the third power combiner 268c represents a quadrature-phase portion that is in communication with a second diode 269b. The diode 269b facilitates a mixing of the combined signals applied thereto. Once again, the power level of the LO is determined to ensure that the diode 269b does not turn on or is otherwise operated in its nonlinear region, i.e., a "starved" mixer. A square-law detected output of the second shunt diode $V_Q=[A \sin(\omega t-\varphi)-A \cos(\omega t-\pi/2)]^2=[A \cos \omega t+A \sin(\omega t-\varphi_{ref})]^2$, can be low-pass filtered to obtain an in-phase I portion of a detected baseband signal $V_q=A^2(1+\sin \varphi_{ref})$. The example I-Q radio module 278 can be considered as an I-Q mixer using Wilkinson dividers and operating with a low-power LO in a starved mixer configuration.

FIG. 2G depicts a graphical representation of the phase encoding of example received RF signal applied to a simulated I-Q radio module of FIG. 2G. According to the illustrative example, the bit period is approximately 10 nanoseconds (nsec). The curve 273 represents a phase of a received RF signal over five consecutive bits between a sample period of 50 nsec. A phase of a first bit is 90°, a phase of the second bit is 180°, a phase of the third bit is 0°, a phase of the fourth bit is −90° (or 270°), and a phase of the fifth bit is 0°.

FIG. 2H depicts a graphical representation of output I and Q signals according to a simulation performed on the I-Q radio module of FIG. 2F according to the input sample of FIG. 2G. According to the 90° phase of the first bit, the I signal 275 is at approximately 0, while the Q signal 274 is at a positive value. According to the 180° phase of the second bit, the I signal 275 is at a negative value, while the Q signal 274 is at approximately 0. According to the 0° phase of the third and fifth bits, the I signal 275 is at a positive value, while the Q signal 274 is at approximately 0. And, according to the −90° phase of the fourth bit, the I signal 275 is at approximately 0, while the Q signal 274 is at a negative value.

FIG. 2I is a block diagram illustrating an example, non-limiting alternative embodiment of an I-Q radio module 250 functioning with the communication network of FIG. 1 and the MIMO communication system of FIG. 2A in accordance with various aspects described herein. The example I-Q radio module 250 is adapted to determine an absolute phase of the received RF carrier between symbols, using a low-powered LO 255. As in the preceding example, the absolute phase may be determined because an absolute phase of the LO signal is known and/or otherwise determinable.

The example I-Q radio module 250 includes an antenna 251, and a first hybrid coupler 252. The antenna 251 is adapted to receive an RF signal, that may include a PSK modulated RF signal. The first hybrid coupler 252 is a four-port device, having two input ports 253a, 253b and two output ports 253c, 253d. A received RF signal $V_r=2A \cos \omega t$, obtained from the antenna 251, is applied to a first input port 253a of the first hybrid coupler 252. An input appearing at a first input port 253a is split into an in-phase portion and a phase-adjusted portion. The in-phase portion is provided as a first output at the first output port 253c, while the phase-adjusted portion is provided as a second output at the second output port 253d. According to the illustrative example, the phase-adjusted portion includes a 180° phase shift in comparison to the received RF signal. The second input port 253b, in this example, is terminated with a resistive element 254. In this instance, the example in-phase output signal at the first output port 253c is $V_{r\alpha}=\sqrt{2}A \cos(\omega t)$, while the phase-adjusted signal at the second output port 253d is $V_{r\alpha}'=-\sqrt{2}A \cos(\omega t)$. The signals have substantially equal amplitudes and differ in phase by about 180°.

The example I-Q radio module 250 includes a second hybrid coupler 263, which in this example is also a four-port device, having two input ports 257a, 257b and two output ports 257c, 257d. A low power LO signal $V_{ILO}=\sqrt{2}A \cos(\omega t-\varphi_{ref})$ obtained from the LO 255, is applied to the first input port 253a of the second hybrid coupler 256. An input appearing at the first input port 257a is split into an in-phase portion and a phase-adjusted portion. The in-phase portion is provided as a first output at the first output port 257c, while the phase-adjusted portion is provided as a second output at the second output port 257d. According to the illustrative example, the phase-adjusted portion includes a 90° phase shift in comparison to the LO signal. The second input port 257b, in this example, is terminated with a resistive element 258. In this instance, the example in-phase output signal at the first output port 257c is $V_{LO\alpha}=\sqrt{2}A \cos(\omega t-\varphi_{ref})$, while the phase-adjusted signal at the second output port 257d is $V_{LO\alpha}'=\sqrt{2}A \sin(\omega t-\varphi_{ref})$. The signals have substantially equal amplitudes and differ in phase by about 90°.

The example I-Q radio module 250 includes a third hybrid coupler 259. The third hybrid coupler 259 in this example is also a four-port device, having two input ports 260a, 260b and two output ports 260c, 260d. The first input 260a of the third hybrid coupler 259 is communicatively coupled to the second output port 253d of the first hybrid coupler 252, receiving therefrom the phase-adjusted portion of the received RF signal $V_{r\alpha}'=\sqrt{2}A \cos(\omega t)$. The second input 260b of the third hybrid coupler 259 is communicatively coupled to the second output port 257d of the second hybrid coupler 256, receiving therefrom the phase-adjusted portion of the LO signal $V_{LO\alpha}'=\sqrt{2}A \sin(\omega t-\varphi_{ref})$. A sum of the phase-adjusted portion of the received RF signal $V_{r\alpha}'$ and the phase-adjusted portion of the LO signal $V_{LO\alpha}'$ is provided at the first output port 260c of the third hybrid coupler 259. This combined signal is applied to a nonlinear device, such as the example diode 261.

According to the illustrative embodiment, the LO 255 is operated in at low-power level sufficiently low to ensure that diode 261 is not turned on, instead operating in a nonlinear, e.g., square-law, portion of its I-V characteristic curve. The nonlinear operation of the diode 261 allows portions of the combined signal to mix, i.e., a starved mixer. The mixed signal may be low-pass filtered to obtain an in-phase I signal $V_i=A^2(1+\cos \varphi_{ref})$. A second output port 260d of the third hybrid coupler is terminated in a resistor 262.

The example I-Q radio module 250 includes a fourth hybrid coupler 263. The fourth hybrid coupler 263 is a four-port device, having two input ports 264a, 264b and two output ports 264c, 264d. The first input 264a of the fourth hybrid coupler 263 is communicatively coupled to the first output port 255c of the second hybrid coupler 256, receiving the phase-adjusted portion of the LO signal $V_{LO\alpha}=\sqrt{2}A \cos(\omega t-\varphi_{ref})$. The second input port 264b of the fourth hybrid coupler 263 is communicatively coupled to the first output port 253c of the first hybrid coupler 252, receiving the in-phase portion of the received RF signal $V_{r\alpha}=\sqrt{2}A\cos(\omega t)$. A sum of the in-phase portion of the LO signal $V_{LO\alpha}$ and the in-phase portion of the received RF signal $V_{r\alpha}$ is provided at the first output port 264c of the fourth hybrid coupler 263. This combined signal is applied to a nonlinear device, such as the example diode 265.

Once again, the LO 255 is operated at a low-power, sufficiently low to ensure that the diode 262 does not turn on, instead operating in a nonlinear, e.g., square-law, portion of its I-V characteristic curve. The nonlinear operation of the diode 262 allows portions of the combined signal to mix, e.g., a starved mixer. The mixed signal may be low-pass filtered to obtain a quadrature-phase Q signal $V_i=A^2(1+\sin\varphi_{ref})$. A second output port 264d of the fourth hybrid coupler is terminated in a resistor 266. The example I-Q radio module 250 can be considered as an alternative embodiment of an I-Q mixer using hybrid coupler devices and operating with a low-powered LO.

Figure 2J:
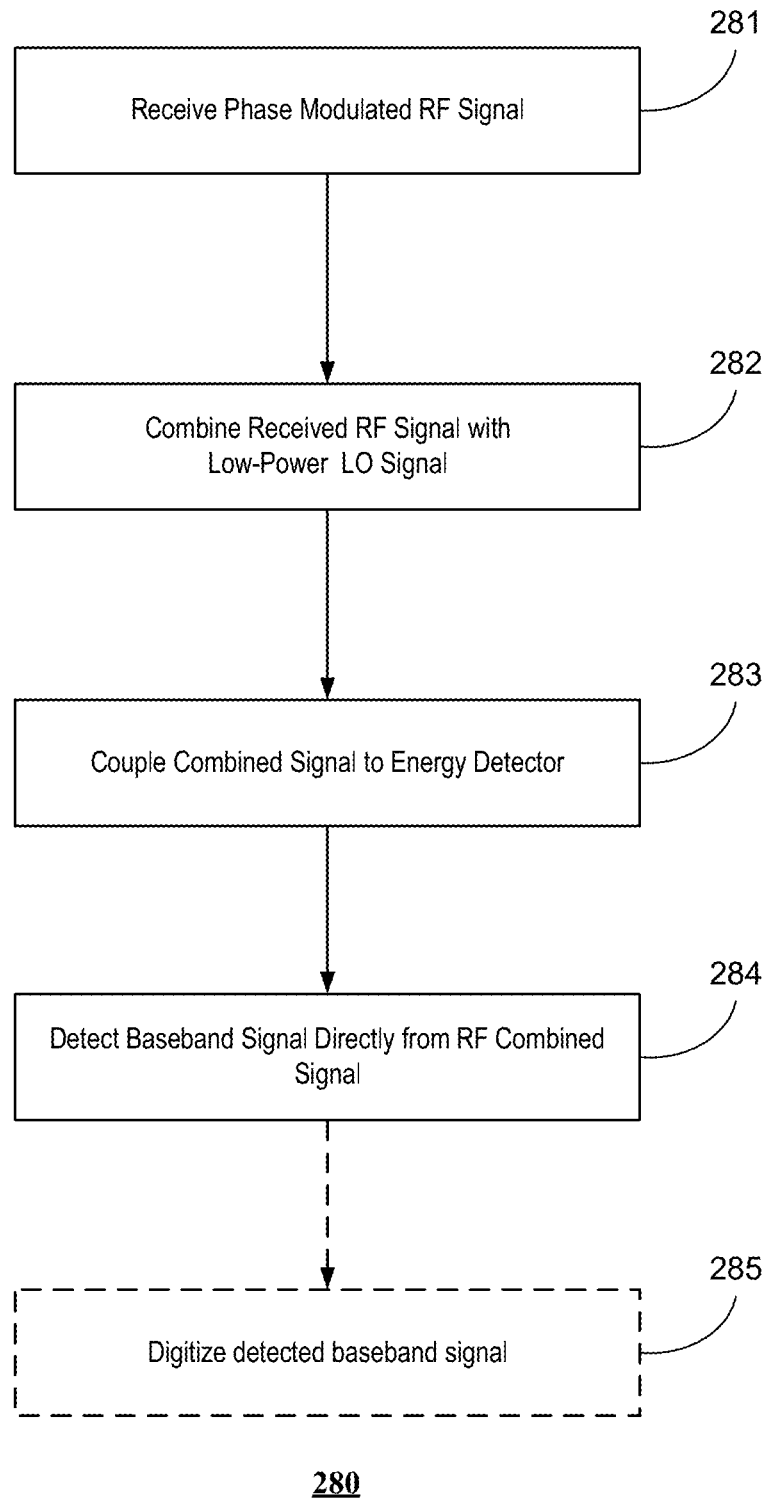
FIG. 2J depicts an illustrative embodiment of a MIMO communication process in accordance with various aspects described herein.

FIG. 2J depicts an illustrative embodiment of a MIMO communication process 280 in accordance with various aspects described herein. A spatially diverse wireless signal is received at 281. The spatially diverse signal may include a spatially multiplexed signal and/or spatially diverse signals resulting from multipath propagation between a transmitter portion 201 and a receiver portion 202 (FIG. 2A). In at least some embodiments, the spatially diverse wireless signal is obtained according to a MIMO process, such as those described in association with new radio and/or Next Generation Long Term Evolution LTE) wireless radio communications. In at least some embodiments, the receiving is accomplished using a transducer, such as an antenna element 211 (FIG. 2B) adapted to generate a received RF signal at an antenna terminal 212 (FIG. 2B) of the antenna 211 responsive to the spatially diverse wireless signal impingent upon the antenna element 211.

According to the example process 280, the received RF signal is combined at 282 with a low-power LO signal. The combining of the signals may be accomplished by summing the signals in a power sense. The signal combining may be accomplished using a resistive device, e.g., a power splitter/combiner, such as a Wilkinson divider/combiner 242, 268b, and 268c (FIGS. 2E and 2F). Alternatively or in addition, the signal combining may be accomplished with one or more hybrid couplers, such as 3 dB couplers 252, 256, 259, 263 (FIG. 2I).

The combined signal may be coupled at 283 to an energy detector of the RF processing/detection module 215 (FIG. 2B), such as a diode 245, 269a, 269b, 261, 265 (FIGS. 2E, 2F and 2I). The coupling may be accomplished by an electrical conductor, e.g., a transmission line extending between the antenna terminal 212 and the energy detector. Alternatively or in addition, the coupling may include one or more of an antenna coupler 213 (FIG. 2B), a balun, a filter, and the like.

In at least some embodiments, the process 280 includes signal conditioning that includes an application of amplitude and/or gain. For example, the received RF signal is amplified, e.g., by an LNA 214 (FIG. 2B) before being applied to a detector of the RF processing/detection module 215. Other signal conditioning may include attenuating interference.

According to the example process 280, a baseband signal is detected at 284 from the received RF signal. For example, a detector of the RF processing/detection module 215, such as any of the diodes 245, 269a, 269b, 261, 265 may be adapted to detect baseband information from the received RF signal, the baseband being obtained by a mixing performed at the detector and/or diode. In particular, the mixing is facilitated by the low-power operation of the LO. Namely, a maximum power of the LO alone, or in combination with the received RF signal is sufficiently low to preserve operation of the detector, e.g., diode, in a nonlinear region of its characteristic curve. This may be accomplished, in the case of a diode detector by preventing the junction from turning on.

For example, the detecting may detect an amplitude and/or an envelope of the received RF signal. In at least some embodiments, detection includes applying the received RF signal to a power detector and applying a low-pass filter to the resulting signal. Alternatively or in addition detection includes applying the received RF signal to a square-law detector. In at least some embodiments, the detecting includes applying the received RF signal to an electrical device having a nonlinear I-V characteristic curve. In at least some embodiments the electrical device may be an active device, such as a transistor. Alternatively or in addition, the electrical device may be a passive device, such as a diode.

According to the example process 280, in at least some embodiments, the detected signal is digitized at 285 (shown in phantom). A digitizing process may be accomplished using a low resolution, e.g., a single-bit ADC 217 (FIG. 2B). The ADC 217 may include a nonlinear process, such as a comparison of the detected signal to a reference, e.g., a threshold voltage. A value of a digital output of the ADC 217 is determined according to a result of the comparison to obtain a binary 1 or a binary 0, as the case may be.

In at least some embodiments, the example process 280 estimates at 285 information transmitted over a wireless channel 208 (FIG. 2A) via the spatially diverse wireless signal. In at least some embodiments, the estimation is obtained via digital signal processing of digital signals obtained from one or more MIMO radio cells 210 (FIG. 2B) or modules 220 (FIG. 2C). Digital signal processing may include, without limitation, a combining of digital signals obtained from at least some of the cells 222, and/or modules 230.

It is envisioned that beamforming may be applied at a spatial diversity transmitter, e.g., a MIMO transmitter. In particular, a massively MIMO signal may employ beamforming to direct MIMO signals to one or more particular spatially diverse receivers. In at least some embodiments, beamforming may be applied at the receiver, e.g., steering an antenna beam towards one or more directions of the spatially diverse signals. However, according to the various examples disclosed herein it is envisioned that the example MIMO receiver portions 202 (FIG. 2A), MIMO cells 222 and/or modules 220 (FIG. 2B) may operate without applying beamforming. Such a relaxation with respect to beamforming relaxes spacing and/or separation, and/or orientation of multiple antennas 211 (FIG. 2B). Likewise, such as relaxation of beamforming at the MIMO receiver portion 202 is consistent with the overall low-power, low-complexity architecture. Accordingly, phase control elements, such as phase shifters, delay lines, and the like are unnecessary at the receiver portion 202.

While for purposes of simplicity of explanation, the respective processes are shown and described as a series of blocks in FIG. 2J, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of communication network 100, the subsystems and functions of the example systems 200, modules or devices 210, 220, 230, 249, 250, 278 and example process 280 presented in FIGS. 1, 2A, 2B, 2C, 2D, 2E, 2F, 2I, 2J and 3. For example, virtualized communication network 300 can include functionality 382, e.g., in one or more VNEs 332 adapted to facilitate in whole or in part receiving, by a first radio module at a first location, a wireless MIMO signal, to obtain a first received RF signal. The wireless MIMO signal includes information originating at a remote MIMO transmitter and conveyed via a wireless channel. An envelope of the first received RF signal is detected by the first radio module without requiring a local oscillator, to obtain a first detected baseband signal. The first detected baseband signal is compared to a reference value to obtain a first digital signal that is provided to a digital processor. The digital processor also obtains a second digital signal from a second radio module receiving the wireless MIMO signal at a second location and determines an estimate of the information originating at the remote MIMO transmitter according to the first and second digital signals.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc., For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350. It is understood that in at least some embodiments, the wireless access 120 may be adapted to include a low-power MIMO radio 383 having an OOK and/or PSK transmitter, and/or an OOK and/or PSK receiver and/or an OOK and/or PSK transceiver according to the low-power, low-complexity radios and related devices disclosed herein.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
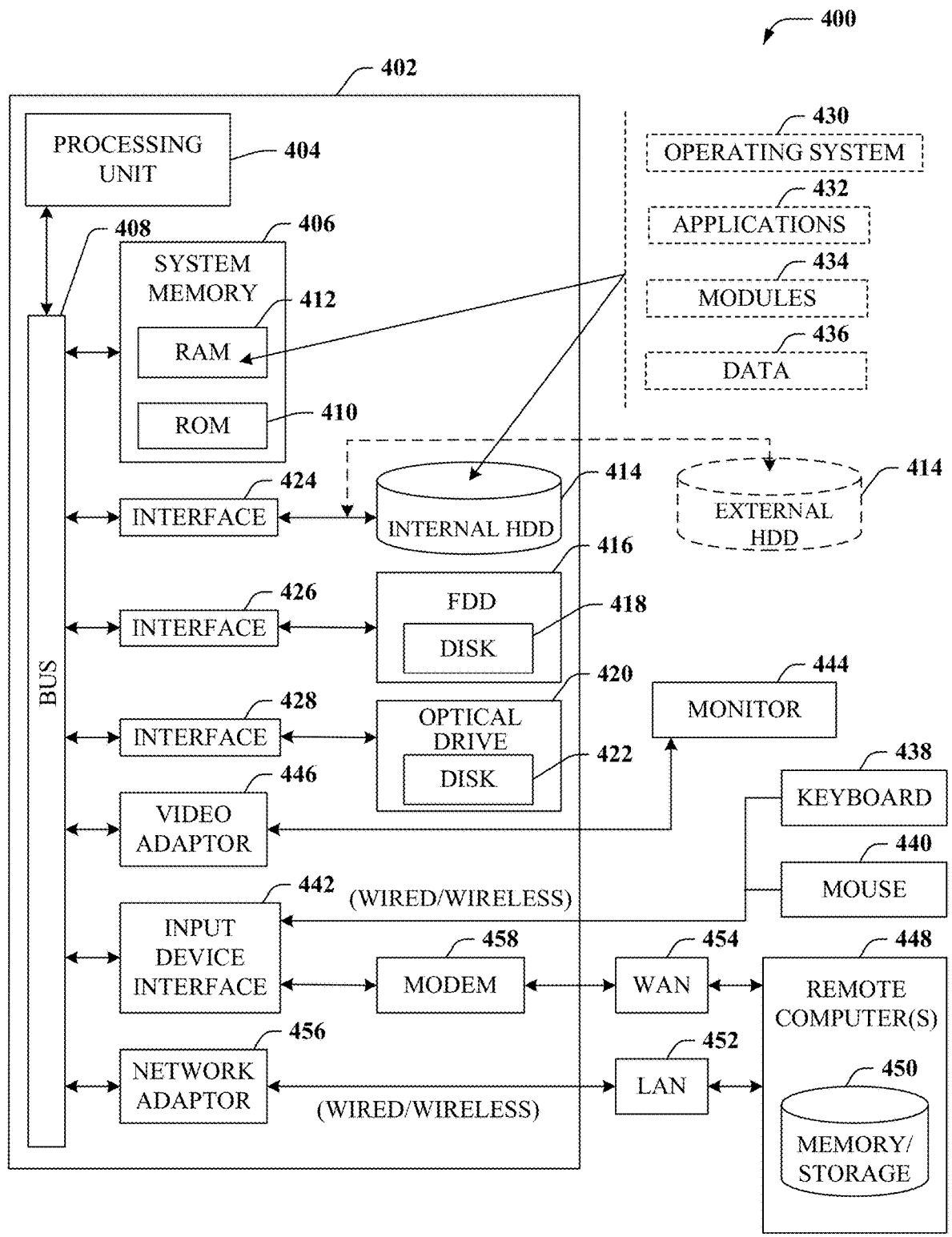
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part receiving, by a first radio module at a first location, a wireless MIMO signal, to obtain a first received RF signal. The wireless MIMO signal includes information originating at a remote MIMO transmitter and conveyed via a wireless channel. An envelope of the first received RF signal is detected by the first radio module without requiring a local oscillator, to obtain a first detected baseband signal. The first detected baseband signal is compared to a reference value to obtain a first digital signal that is provided to a digital processor. The digital processor also obtains a second digital signal from a second radio module receiving the wireless MIMO signal at a second location and determines an estimate of the information originating at the remote MIMO transmitter according to the first and second digital signals.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM),flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies.

Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT or 100BaseT wired Ethernet networks used in many offices.

Figure 5:
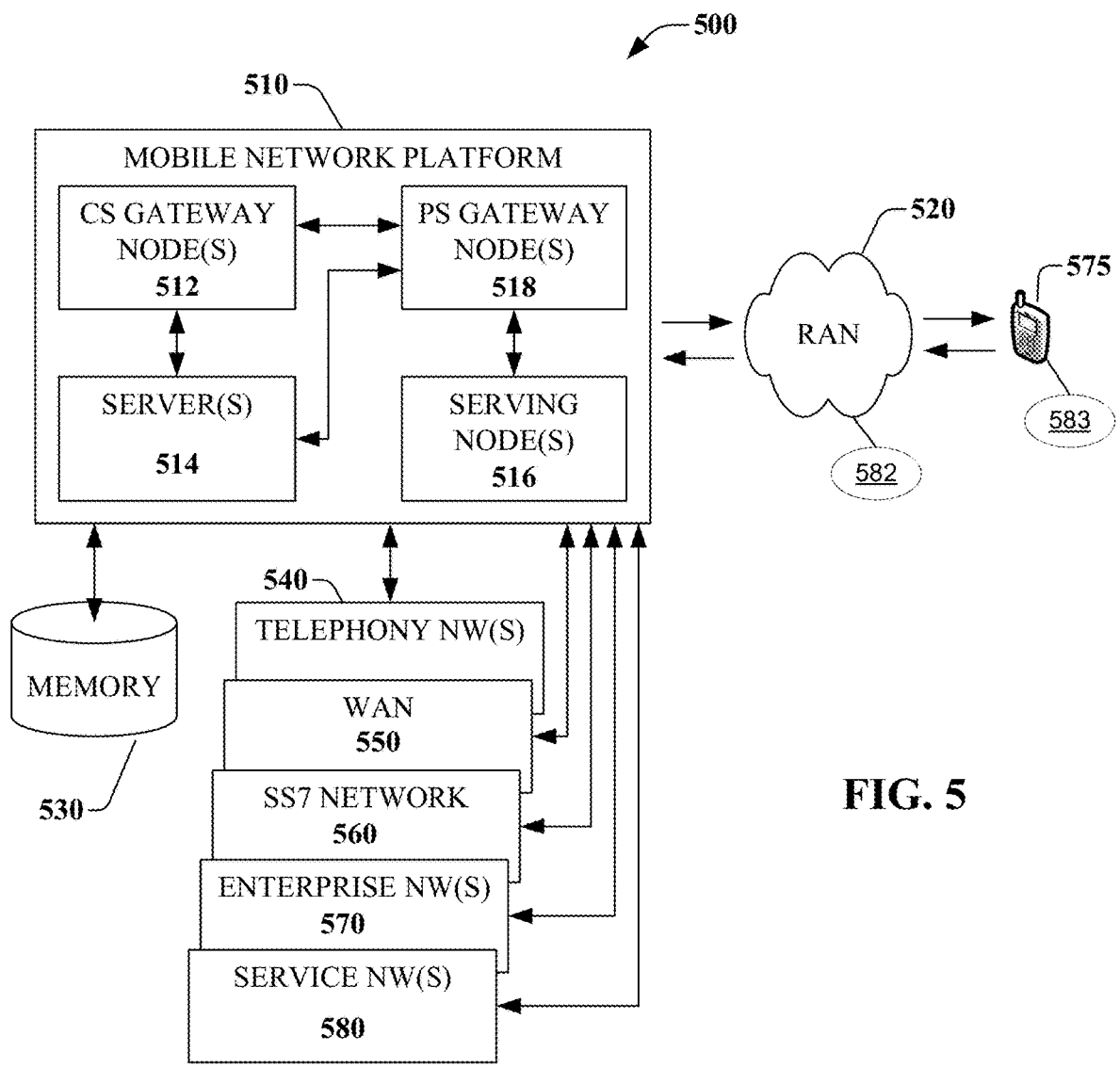
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part receiving, by a first radio module at a first location, a wireless MIMO signal, to obtain a first received RF signal. The wireless MIMO signal includes information originating at a remote MIMO transmitter and conveyed via a wireless channel. An envelope of the first received RF signal is detected by the first radio module without requiring a local oscillator, to obtain a first detected baseband signal. The first detected baseband signal is compared to a reference value to obtain a first digital signal that is provided to a digital processor. The digital processor also obtains a second digital signal from a second radio module receiving the wireless MIMO signal at a second location and determines an estimate of the information originating at the remote MIMO transmitter according to the first and second digital signals. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

In at least some embodiments, the base station or access RAN 520 may be adapted to include a low-power MIMO radio 582 having an OOK and/or PSK transmitter, and/or an OOK and/or PSK receiver and/or an OOK and/or PSK transceiver according to the low-power, low-complexity radios and related devices disclosed herein. Likewise, in at least some embodiments, the mobile device 575 may be adapted to include a low-power MIMO radio 583 having an OOK and/or PSK transmitter, and/or an OOK and/or PSK receiver and/or an OOK and/or PSK transceiver according to the low-power, low-complexity radios and related devices disclosed herein.

It is to be noted that server(s) 514 can comprise one or more processors configured to confer at least in part the functionality of mobile network platform 510. To that end, the one or more processor can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

Figure 6:
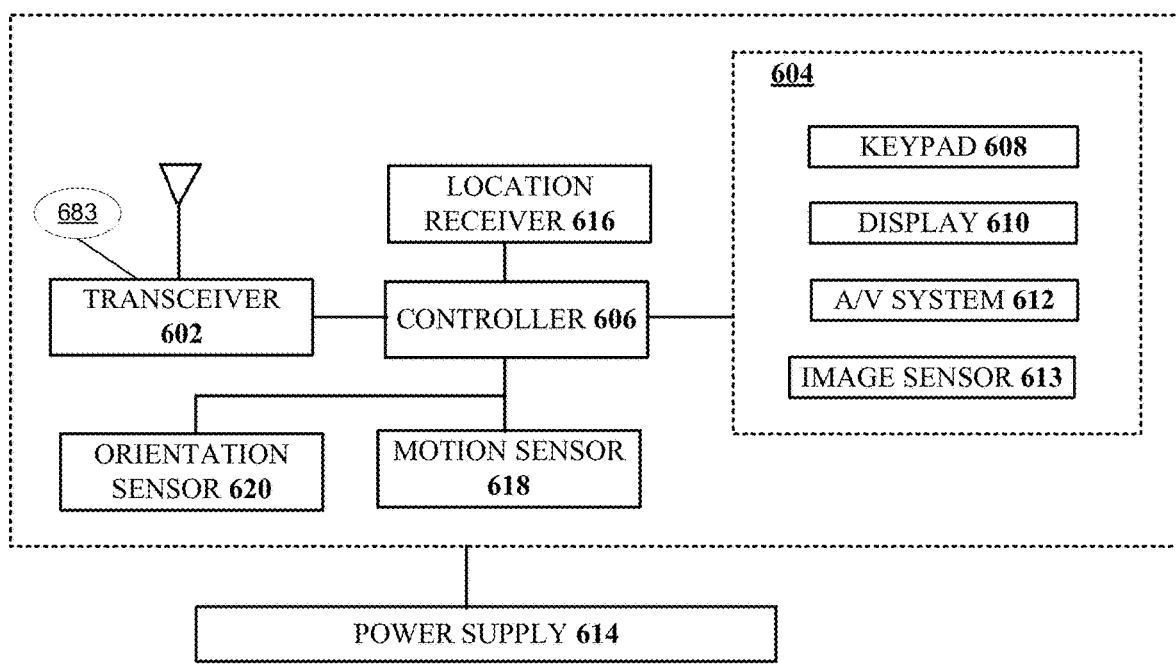
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part receiving, by a first radio module at a first location, a wireless MIMO signal, to obtain a first received RF signal. The wireless MIMO signal includes information originating at a remote MIMO transmitter and conveyed via a wireless channel. An envelope of the first received RF signal is detected by the first radio module without requiring a local oscillator, to obtain a first detected baseband signal. The first detected baseband signal is compared to a reference value to obtain a first digital signal that is provided to a digital processor. The digital processor also obtains a second digital signal from a second radio module receiving the wireless MIMO signal at a second location and determines an estimate of the information originating at the remote MIMO transmitter according to the first and second digital signals.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive, or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600. In at least some embodiments, the transceiver 602 may be adapted to include a low-power MIMO radio 683 having an OOK and/or PSK transmitter, and/or an OOK and/or PSK receiver and/or an OOK and/or PSK transceiver according to the low-power, low-complexity radios and related devices disclosed herein.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

Although the example embodiments disclosed herein are directed to MIMO applications, it is understood that the disclosed techniques may be applied, without limitation, to other applications. For example, whereas MIMO systems may use multiple transmitters, it is understood that the receiver systems, devices, and/or techniques disclosed herein may be used to receive and/or otherwise process RF signals from a single transmitter. Likewise, the receiver systems, devices, and/or techniques disclosed herein may be used to receive and/or otherwise process RF signals from a multiple different transmitters, not necessarily within a MIMO context. It is conceivable that the receiver systems, devices, and/or techniques disclosed herein may be used to process RF signals received from remote transmitters and/or RF signals received from a nearby, or even collocated transmitter. The RF signals may be signals received via line of sight and/or signals received by way of one or more reflections, e.g., vial multipath and/or echo return as in a RADAR application.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A radio receiver, comprising a non-linear energy detector that obtains baseband information from a mixed signal that corresponds to an information component of a received radio frequency (RF) signal, wherein the mixed signal comprises a local oscillator signal combined, without multiplication, with the received RF signal, wherein the received RF signal comprises a carrier wave component operating at a carrier frequency within a millimeter wave spectrum, wherein the non-linear energy detector is associated with a non-linear current-voltage (I-V) characteristic curve, and wherein the baseband information is obtained by applying the mixed signal to the non-linear I-V characteristic curve.

2. The radio receiver of claim 1, wherein the applying of the mixed signal to the non-linear I-V characteristics curve generates a detected baseband signal, wherein the baseband information is obtained from the detected baseband signal.

3. The radio receiver of claim 2, wherein the detected baseband signal is generated based on amplitude of the mixed signal.

4. The radio receiver of claim 2, wherein the detected baseband signal is determined according to the non-linear I-V characteristic curve.

5. The radio receiver of claim 2, comprising an analog-to-digital converter (ADC) communicatively coupled to the non-linear energy detector, wherein the ADC is adapted to generate a digital signal according to the detected baseband signal.

6. The radio receiver of claim 5, wherein the ADC comprises a comparator adapted to compare the detected baseband signal to a reference value to obtain a comparison result, and wherein the digital signal is obtained according to the comparison result.

7. The radio receiver of claim 6, wherein the reference value comprises a threshold voltage.

8. The radio receiver of claim 1, wherein the received RF signal is obtained via an antenna responsive to illumination of the antenna by a spatially diverse RF signal transmitted from a multiple input multiple output (MIMO) transmitter.

9. The radio receiver of claim 8, wherein phase modulation of the carrier wave component is impressed upon the spatially diverse RF signal by the MIMO transmitter.

10. The radio receiver of claim 1, comprising a low noise amplifier (LNA) communicatively coupled between an antenna adapted to receive the received RF signal.

11. The radio receiver of claim 10, wherein the LNA is operated in saturation.

12. The radio receiver of claim 1, wherein the non-linear energy detector comprises a diode.

13. A multiple input multiple output (MIMO) radio, comprising a non-linear energy detector that obtains baseband information from a mixed signal that corresponds to an information component of a received radio frequency (RF) signal, wherein the mixed signal comprises a local oscillator signal combined, without multiplication, with the received RF signal, wherein the received RF signal comprises a carrier wave component operating at a carrier frequency within a millimeter wave spectrum, wherein the received RF signal is obtained via an antenna responsive to illumination of the antenna by a spatially diverse RF signal transmitted from a MIMO transmitter, wherein the non-linear energy detector is associated with a non-linear current-voltage (I-V) characteristic curve, and wherein the baseband information is obtained by applying the mixed signal to the non-linear I-V characteristic curve.

14. The MIMO radio of claim 13, wherein the applying of the mixed signal to the non-linear I-V characteristics curve generates a detected baseband signal, wherein the baseband information is obtained from the detected baseband signal.

15. The MIMO radio of claim 14, wherein the detected baseband signal is generated based on amplitude of the mixed signal.

16. The MIMO radio of claim 14, wherein the detected baseband signal is determined according to the non-linear I-V characteristic curve.

17. The MIMO radio of claim 14, comprising an analog-to-digital converter (ADC) communicatively coupled to the non-linear energy detector, wherein the ADC is adapted to generate a digital signal according to the detected baseband signal.

18. The MIMO radio of claim 17, wherein the ADC comprises a comparator adapted to compare the detected baseband signal to a reference value to obtain a comparison result, and wherein the digital signal is obtained according to the comparison result.

19. The MIMO radio of claim 18, wherein the reference value comprises a threshold voltage.

20. A method, comprising:
- generating, by a non-linear energy detector, a detected baseband signal in response to applying, by the non-linear energy detector, a mixed signal to a non-linear I-V characteristic associated with the non-linear energy detector; and
- obtaining, by the non-linear energy detector, a baseband information from the detected baseband signal that corresponds to an information component of a received radio frequency (RF) signal, wherein the mixed signal comprises a local oscillator signal combined, without multiplication, with the received RF signal, wherein the received RF signal comprises a carrier wave component operating at a carrier frequency within a millimeter wave spectrum.

* * * * *